(12) United States Patent
Otsuka et al.

(10) Patent No.: US 10,435,081 B2
(45) Date of Patent: Oct. 8, 2019

(54) JOINING STRUCTURE

(71) Applicant: NIPPON STEEL & SUMITOMO METAL CORPORATION, Tokyo (JP)

(72) Inventors: Kenichiro Otsuka, Tokai (JP);
Yoshiaki Nakazawa, Takarazuka (JP);
Ryuichi Nishimura, Kimitsu (JP);
Masanori Yasuyama, Kobe (JP)

(73) Assignee: NIPPON STEEL CORPORATION, Tokyo (JP)

( * ) Notice: Subject to any disclaimer, the term of this patent is extended or adjusted under 35 U.S.C. 154(b) by 130 days.

(21) Appl. No.: 15/502,435

(22) PCT Filed: Aug. 28, 2015

(86) PCT No.: PCT/JP2015/074436
§ 371 (c)(1),
(2) Date: Feb. 7, 2017

(87) PCT Pub. No.: WO2016/031964
PCT Pub. Date: Mar. 3, 2016

(65) Prior Publication Data
US 2017/0225717 A1    Aug. 10, 2017

(30) Foreign Application Priority Data

Aug. 29, 2014 (JP) ................................ 2014-175620
Feb. 4, 2015 (JP) ................................ 2015-020332

(51) Int. Cl.
*B62D 25/20* (2006.01)
*B23K 1/00* (2006.01)
(Continued)

(52) U.S. Cl.
CPC ............ *B62D 25/2036* (2013.01); *B23K 1/00* (2013.01); *B23K 11/11* (2013.01); *B62D 25/025* (2013.01);
(Continued)

(58) Field of Classification Search
CPC .. B62D 25/2036; B62D 25/025; B62D 25/04; B62D 27/023; B23K 11/11; B23K 11/115
(Continued)

(56) References Cited

U.S. PATENT DOCUMENTS 1,363,156 A * 12/1920 Murray .............. B23K 11/0026
219/105
2,024,686 A * 12/1935 Farmer .................... B23K 9/23
219/137 R
(Continued)

FOREIGN PATENT DOCUMENTS

| CN | 102673660 A | 9/2012 |
|---|---|---|
| EP | 1061240 A2 | 12/2000 |

(Continued)

OTHER PUBLICATIONS

Machine translation of Japanese Patent Publicaiton 2010-167425-A, printed from the JPO website, Feb. 14, 2019, pp. 1-3.*
(Continued)

*Primary Examiner* — Jason S Morrow
(74) *Attorney, Agent, or Firm* — Birch, Stewart, Kolasch & Birch, LLP

(57) ABSTRACT

A joining structure of the invention includes a first metal sheet and a pair of second metal sheets. Each of the pair of second metal sheets is overlapped on the first metal sheet in a state where an end surface of one of the second metal sheets and an end surface of the other second metal sheet face each other, and the end surfaces that face each other are integrally joined to the first metal sheet by means of a single mass of melted metal.

7 Claims, 20 Drawing Sheets

(51) Int. Cl.
*B23K 11/11* (2006.01)
*B62D 25/04* (2006.01)
*B62D 25/02* (2006.01)
*B62D 27/02* (2006.01)

(52) U.S. Cl.
CPC ............ *B62D 25/04* (2013.01); *B62D 25/20* (2013.01); *B62D 27/023* (2013.01)

(58) Field of Classification Search
USPC .......................................................... 296/29
See application file for complete search history.

(56) References Cited

U.S. PATENT DOCUMENTS

| | | | | |
|---|---|---|---|---|
| 6,601,909 | B2* | 8/2003 | Obara | B23K 11/06 296/191 |
| 2004/0119321 | A1 | 6/2004 | Kasuga | |
| 2005/0189790 | A1 | 9/2005 | Chernoff et al. | |
| 2010/0098969 | A1* | 4/2010 | Hashimura | B21J 15/025 428/653 |
| 2016/0362144 | A1* | 12/2016 | Potthast | B23K 31/02 |
| 2017/0349221 | A1* | 12/2017 | Yamada | B23K 11/34 |

FOREIGN PATENT DOCUMENTS

| | | |
|---|---|---|
| EP | 1061240 A3 | 12/2002 |
| JP | 53-82631 | 7/1978 |
| JP | 3-24383 U | 3/1991 |
| JP | 8-309554 A | 11/1996 |
| JP | 2006-187786 A | 7/2006 |
| JP | 2006-205901 A | 8/2006 |
| JP | 3820867 B2 | 9/2006 |
| JP | 2008-238267 A | 10/2008 |
| JP | 2010-167425 A | 8/2010 |
| JP | 2011-161466 A | 8/2011 |
| JP | 2012-110937 A | 6/2012 |
| JP | 2012-144185 A | 8/2012 |
| JP | 5082249 B2 | 11/2012 |
| JP | 5261984 B2 | 8/2013 |
| JP | 5378738 B2 | 12/2013 |
| JP | 5411245 B2 | 2/2014 |
| JP | 2014-188548 A | 10/2014 |
| JP | 5599553 B2 | 10/2014 |
| SU | 1684151 A1 | 10/1991 |
| WO | WO 2012/138916 A1 | 10/2012 |
| WO | WO 2014/007145 A1 | 1/2014 |

OTHER PUBLICATIONS

Japanese Office Action dated Oct. 24, 2017, issued in Japanese Patent Application No. 2016-545637.
International Search Report for PCT/JP2015/074436 (PCT/ISA/210) dated Nov. 17, 2015.
Written Opinion of the International Searching Authority for PCT/JP2015/074436 (PCT/ISA/237) dated Nov. 17, 2015.
Russian Office Action and Search Report for Russian Counterpart Application No. 2017105812, dated Apr. 26, 2018, with English translations.
Chinese Office Action and Search Report for counterpart Chinese Application No. 201580045344.7, dated Jun. 5, 2018, with English translation of the Search Report.
European Office Action issued in corresponding European Application No. 15 83 6716.9 and dated Apr. 5, 2018.
Indian Office Action for counterpart Indian Application No. 201717003873, dated Apr. 24, 2019 with English translation.

* cited by examiner

JOINING STRUCTURE

TECHNICAL FIELD

The present invention relates to a joining structure.

Priority is claimed on Japanese Patent Application No. 2014-175620, filed Aug. 29, 2014, and Japanese Patent Application No. 2015-020332, filed Feb. 4, 2015, the contents of which are incorporated herein by reference.

BACKGROUND ART

Automobile vehicle bodies having monocoque structure are assembled by joining a plurality of formed panels in a state where respective edge parts are overlapped on each other. Resistance spot welding, laser welding, or the like is used for the welding between the formed panels. In the automobile vehicle bodies, structural members, such as a side sill (locker), a side member, and various pillars, are joined to a portion to which a high load is applied and a portion on which a heavy load, such as an engine, is mounted. Accordingly, rigidity and strength required for the automobile vehicle bodies are guaranteed.

In recent years, it is required that the joining strength between the respective structural members and various rigidities (torsional rigidity and bending rigidity) thereof are further enhanced. Meanwhile, in order to reduce the amount of emission of greenhouse gases by virtue of improvement in fuel efficiency, further weight reduction of the respective structural members is also required.

For example, a joining structure between a side sill that is a structural member of an automobile vehicle body, and another structural member is disclosed in the following Patent Document 1. Inward flanges that are bent toward the inside of the side sill is provided at an end part of the side sill in a longitudinal direction. The side sill is joined to the other structural member (for example, a lower A pillar) via the above inward flanges.

The following Patent Document 2 discloses a vehicle side part structure including a side sill outer panel having a side sill outer part, a side sill stiffener that extends in a forward-backward direction of a vehicle body inside the side sill outer part and is joined to the side sill outer part, a rear wheel housing member having a front wall that faces a rear end of the side sill stiffener, and a coupling member having a rear wall that is connected to a rear end part of the side sill stiffener and stops up a rear end opening of the side sill stiffener, the front wall of the rear wheel housing member and a rear wall of the coupling member being joined together. According to this vehicle side part structure, rigidity on a side sill rear end side can be improved.

Moreover, the following Patent Document 3 discloses a frontside member having a frontside member main body and a kick-up part located below the frontside member main body at a rear part thereof. This frontside member is configured by butting a pair of left and right inner member and outer member against each other to perform spot welding of these members. The inner member and the outer member have upward-downward intermediate parts that are formed in a recessed shape so as to be in contact with each other. By butting the upward-downward intermediate parts against each other to perform spot welding of these intermediate parts, the frontside member is provided with a coupling part.

FIG. 22 is a view illustrating an example of the structure of a general automobile vehicle body 200. As illustrated in FIG. 22, the automobile vehicle body 200 includes a side sill (locker) 202, an A pillar (front pillar) 203, a B pillar (center pillar) 204, a roof rail 205, and the like as structural members.

With higher performance of automobiles, further enhancing the rigidity (torsional rigidity and bending rigidity) of the automobile vehicle body 200 to further improve comport, such as operation stability and silence, is required.

FIG. 23 is a perspective view illustrating an example of the side sill 202. In addition, in order to make the drawing easily understood, even in FIG. 23, a side sill inner panel 206 and a side sill outer panel 207 are illustrated in a transparent state by two-dot chain lines.

As illustrated in FIG. 23, the side sill 202 has a closed section consisting of the side sill inner panel 206, the side sill outer panel 207, a first reinforcement 208, and a second reinforcement 209.

The side sill inner panel 206 has two flanges 206a and 206b at both end parts thereof in a width direction, respectively, and has a hat-shaped cross-sectional shape having these two flanges 206a and 206b as elements.

The side sill outer panel 207 has two flanges 207a and 207b at both end parts thereof in a width direction, respectively, and has a hat-shaped cross-sectional shape having these two flanges 207a and 207b as elements.

The first reinforcement 208 is disposed between the two flanges 206a and 206b and the two flanges 207a and 207b, and is joined to the side sill inner panel 206 and the side sill outer panel 207 by welding nuggets 210 (mass of melted metal) formed by the resistance spot welding, in a state where the first reinforcement is overlapped on the side sill inner panel 206 and the side sill outer panel 207 in a three-layer overlapped manner.

The second reinforcement 209, similar to the first reinforcement 208, is also disposed between the two flanges 206a and 206b and the two flanges 207a and 207b, and is joined to the side sill inner panel 206 and the side sill outer panel 207 by the welding nuggets 210 formed by the resistance spot welding, in a state where the second reinforcement is overlapped on the side sill inner panel 206 and the side sill outer panel 207 in a three-layer overlapped manner. Moreover, the first reinforcement 208 and the second reinforcement 209 are struck (made to abut) against each other or disposed apart from each other, in the longitudinal direction of each of the side sill inner panel 206 and the side sill outer panel 207.

In addition, usually, since the welding nuggets 210 are formed at a sheet-thickness-direction central part, the welding nuggets 210 cannot be viewed from the outside. However, for convenience of description, the welding nuggets 210 are illustrated in FIG. 23 so that the positions of the welding nuggets can be recognized.

In this way, most of the structural members used for the structural bodies are assembled by welding. For this reason, in order to enhance the rigidity of the automobile vehicle body, it is effective to use linear continuous welding, such as laser welding, electric arc welding, or plasma welding. On the other hand, since the resistance spot welding that is most frequently used because of low costs as a method for welding the structural members of the automobile vehicle body is not continuous welding but dot-like discontinuous welding, this resistance spot welding is more disadvantageous in respect of the rigidity of the structural members than the continuous welding. For this reason, even if the resistance spot welding is used, techniques that can improve the rigidity of the automobile vehicle body have been developed.

For example, various kinds of structural members assembled by the resistance spot welding are disclosed in the following Patent Documents 4 to 6.

CITATION LIST

Patent Literature

Patent Document 1: Japanese Unexamined Patent Application, First Publication No. 2012-144185
Patent Document 2: Japanese Patent No. 5411245
Patent Document 3: Japanese Patent No. 3820867
Patent Document 4: Japanese Patent No. 5082249
Patent Document 5: Japanese Patent No. 5599553
Patent Document 6: Japanese Patent No. 5261984

SUMMARY OF INVENTION

Technical Problem

In the joining structure of the automobile vehicle body disclosed in Patent Document 1, the side sill is joined to the other structural member via the inward flanges in a state where a gap is present between inward flanges adjacent to each other. That is, since the side sill and the other structural member are joined together in a state where the adjacent inward flanges are apart from each other, the rigidity of the side sill decreases. As a result, a function required as the side sill declines.

Additionally, in order to suppress the decrease in the rigidity of the side sill, a method for joining side sill and the other structural member by joining overlapped parts of the inward flanges and their vicinities in state where the adjacent inward flanges are overlapped on each other is also considered. However, in this method, an increase in weight is caused due to overlapping of portions of the adjacent inward flanges on each other. As a result, it becomes difficult to realize significant weight reduction that is extremely strongly required for current automobile vehicle bodies for reduction of global warming gases.

In the structure disclosed in Patent Document 2, it is necessary to use a new component such as the coupling member. That is, in this structure, an increase in weight is caused due to addition of the coupling member. As a result, it becomes difficult to realize weight reduction that is strongly required for the automobile vehicle bodies as described above.

In the structure disclosed in Patent Document 3, butting spot welding is performed on a surface that originally has a low joining strength and becomes perpendicular to a collision direction (vehicle longitudinal direction). Therefore, breaking easily occurs in a spot welding part at the time of a collision, and desired collision properties cannot be obtained. Additionally, if only edges of different members are subjected to the butting spot welding, these members are apt to be fractured.

A side sill 202 having a structure having a closed section consisting of the structural members illustrated in FIG. 23, that is, the side sill inner panel 206, the side sill outer panel 207, the first reinforcement 208, and the second reinforcement 209 and having a structure in which the first reinforcement 208 and the second reinforcement 209 are butted against or disposed apart from the side sill inner panel 206 and the side sill outer panel 207 in a longitudinal direction of each thereof is not disposed or suggest in Patent Documents 4 to 6.

For this reason, the side sill 202 having a structure that can enhance rigidity as much as possible even by the resistance spot welding cannot be provided even if it is based on the inventions disclosed in Patent Documents 4 to 6.

As described above, the structural members of the automobile vehicle body such as the side sill 202 need to be low in cost, light in weight, and high in rigidity. Although it is possible to enhance the rigidity of the structural members by expanding the welding range of the two flanges 206a and 206b and the two flanges 207a and 207b in the side sill 202 (for example, increasing the number of times of spot welding (the number of welding nuggets)), an increase in welding cost resulting from expanding the welding range cannot be denied.

Additionally, if the two flanges 206a and 206b and the two flanges 207a and 207b are overlapped on each other and joined together in the longitudinal direction of each of the side sill inner panel 206 and the side sill outer panel 207, the rigidity of the structural members can be enhanced. However, not only material costs increase correspondingly but also the weight of the structural members increases.

For this reason, it is necessary to develop structural members having a structure that can improve rigidity per one spot welding without expanding the welding range of the two flanges 206a and 206b and the two flanges 207a and 207b.

In this way, in recent years, it is necessary to realize three requirements such as cost reduction, weight reduction, and higher rigidity for the structural bodies in a well-balanced manner. For example, if the welding range of the flanges is expanded by increasing the number of times of spot welding, the rigidity of the automobile vehicle body is improved but welding costs rise inevitably with the expansion of the welding range. Additionally, if the flanges are enlarged, the rigidity of the automobile vehicle body is improved but material costs increase and the weight of the automobile vehicle body also increases, with an increase in size of the flanges. As a result, it becomes difficult to realize weight reduction of the automobile vehicle body.

In the above description, the automobile vehicle body has been mentioned as an example as a structural body in which cost reduction, weight reduction, and higher rigidity are required. However, cost reduction, weight reduction, and higher rigidity are often required for, for example, other structural bodies, such as vehicle bodies of railroad vehicles and fuselages of aircrafts, without being limited to the automobile vehicle body.

Therefore, in recent years, it is very important to develop techniques capable of realizing cost reduction, the weight reduction, and higher rigidity required for structural bodies including the automobile vehicle body in a well-balanced manner.

The invention has been made in view of the above circumstances, and an object thereof is to provide a joining structure capable of realizing three requirements such as cost reduction, weight reduction, and higher rigidity for structural bodies in a well-balanced manner.

Solution to Problem

The invention adopts the following means in order to solve the above problems to achieve the relevant object.

(1) A joining structure related to an aspect of the invention includes a first metal sheet and a pair of second metal sheets. Each of the pair of second metal sheets is overlapped on the first metal sheet in a state where an end surface of one of the second metal sheets and an end surface of the other second metal sheet face each other, and the end surfaces that face each other are integrally joined to the first metal sheet by means of a single mass of melted metal.

(2) In the joining structure described in the above (1), the pair of second metal sheets may be present on the same plane.

(3) In the joining structure described in the above (1) or (2), a distance between the end surfaces that face each other may be equal to or more than 0 mm and less than 1 mm.

(4) In the joining structure described in the above (1) or (2), the following Conditional Expression (a) may be satisfied when a sheet thickness of the pair of second metal sheets is defined as t (mm) and the distance between the end surfaces that face each other is defined as G (mm).

$$0 \text{ mm}^2 \leq G \times t \leq 1 \text{ mm}^2 \qquad (a)$$

(5) In the joining structure described in the above (1) or (2), the distance between the end surfaces that face each other may be less than 40% of the sheet thickness of the second metal sheets.

(6) In the joining structure described in any one of the above (1) to (5), an extension length of the end surfaces that face each other may be equal to or more than 3 mm and less than 50 mm.

(7) In the joining structure described in any one of the above (1) to (6), the pair of second metal sheets may be a pair of inward flanges provided in a material-axis-direction end part of a metal-formed sheet having a constant sectional shape in the material axis direction.

(8) In the joining structure described in the above (7), the sectional shape of the metal-formed sheet may be an angular shape, a channel shape, or a quadrangular shape.

(9) In the joining structure described in the above (7) or (8), the metal-formed sheet may be a side sill of an automobile vehicle body, and the first metal sheet may be a portion of a lower A pillar of the automobile vehicle body.

(10) The joining structure described in any one of the above (1) to (6) may further include a third metal sheet. The pair of second metal sheets may be sandwiched between the first metal sheet and the third metal sheet, and the end surfaces that face each other may be integrally joined to the first metal sheet and the third metal sheet by means of the mass of melted metal.

(11) In the joining structure described in the above (10), the first metal sheet may be a flange provided in a first metal-formed sheet having a hat-like sectional shape in the material axis direction, and the third metal sheet may be a flange provided in a second metal-formed sheet having a hat-like sectional shape in the material axis direction.

(12) In the joining structure described in the above (11), the first metal-formed sheet may be a side sill outer panel of an automobile vehicle body, the second metal-formed sheet may be a side sill inner panel of the automobile vehicle body, and each of the pair of second metal sheets may be a reinforcement or a center pillar inner panel of the automobile vehicle body.

Advantageous Effects of Invention

According to the above aspect of the invention, a joining structure capable of realizing three requirements such as cost reduction, weight reduction, and higher rigidity for the structural bodies in a well-balanced manner can be provided.

DESCRIPTION OF EMBODIMENTS

Hereinafter, embodiments of the invention will be described referring the drawings. In addition, an automobile vehicle body will be exemplified and described as a structural body in which cost reduction, weight reduction, and higher rigidity are required.

First Embodiment

A first embodiment of the invention will first be described. As already described, the automobile vehicle body includes a side sill and a lower A pillar as structural members. In the following first embodiment, a form in which a joining structure of the invention is applied to a joining structure between the side sill and the lower A pillar will be described.

Figure 1:
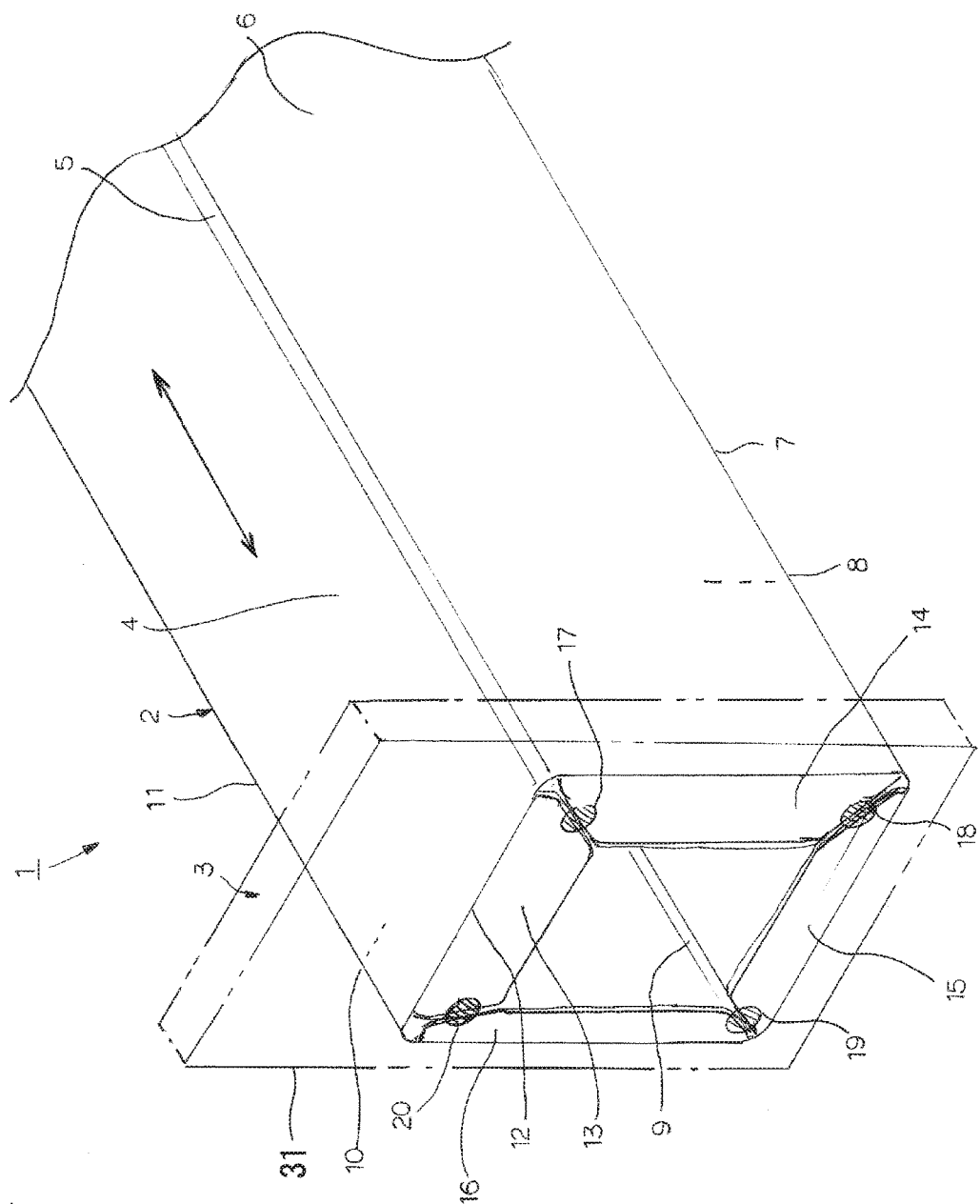
FIG. 1 is a perspective view schematically illustrating a joining structure 1 (the joining structure between a side sill 2 and a lower A pillar 3) related to a first embodiment of the invention.
Figure 2:
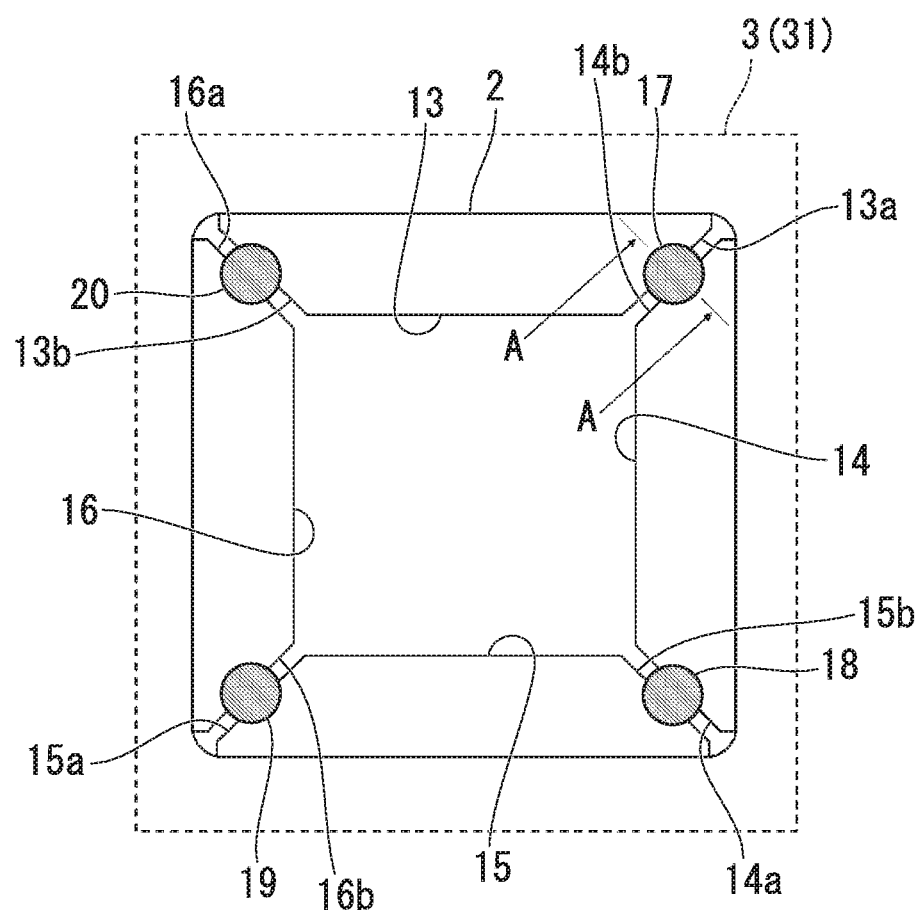
FIG. 2 is a view when the joining structure 1 illustrated in FIG. 1 is seen from the lower A pillar 3 side.

FIG. 1 is a perspective view schematically illustrating a joining structure 1 (the joining structure between a side sill 2 and a lower A pillar 3) related to the first embodiment of the invention. FIG. 2 is a view when the joining structure 1 illustrated in FIG. 1 is seen from the lower A pillar 3 side.

In addition, although the joining structure 1 between the side sill 2 and the lower A pillar 3 will be described in the first embodiment, the invention is not limited only to this form. Respective shapes of the side sill 2 and the lower A pillar 3 are simplified and illustrated in FIGS. 1 and 2. Additionally, in FIGS. 1 and 2, in order to make the drawings easily understood, the lower A pillar 3 is illustrated in a perspective state, using two-dot chain line.

(Side Sill 2)

The side sill 2 is a metal-formed sheet having a constant sectional shape (a quadrangular shape in the present embodiment) in a material axis direction (an arrow direction illustrated in FIG. 1). More specifically, the side sill 2 is an elongated hollow tubular press-formed body made of high tensile strength steel sheet of which the tensile strength is normally in a class of 590 MPa (preferably in a class of 780 MPa and still more desirably in a class of 980 MPa). The press forming may be cold press or may be hot press.

The side sill 2 includes at least a first surface 4, a first ridgeline 5, and a second surface 6.

The first surface 4 extends in the material axis direction. The first ridgeline 5 is connected to the first surface 4 and extends in the material axis direction. Moreover, the second surface 6 is connected to the first ridgeline 5 and extends in the material axis direction.

The side sill 2 has a substantially quadrangular cross-sectional shape. For that reason, the side sill 2 further includes a second ridgeline 7 connected to the second surface 6, a third surface 8 connected to the second ridgeline 7, a third ridgeline 9 connected to the third surface 8, a fourth surface 10 connected to the third ridgeline 9, and a fourth ridgeline 11 connected to the fourth surface 10 and the first surface 4.

The side sill 2 may have not the quadrangular cross-sectional shape but, for example, a substantially angular cross-sectional shape. In this case, the side sill 2 has only the first surface 4, the first ridgeline 5, and the second surface 6. Additionally, the side sill 2 may have a channel-like sectional shape. In this case, the side sill 2 has only the first surface 4, the second surface 6, the third surface 8, the first ridgeline 5, and the second ridgeline 7.

A first inward flange 13, a second inward flange 14, a third inward flange 15, and a fourth inward flange 16 are provided at a material-axis-direction end part 12 of the side sill 2 so as to be present on the same plane.

The first inward flange 13 is formed to be connected to the first surface 4.

The second inward flange 14 is connected to the second surface 6, and is formed with a gap between the second inward flange 14 and the first inward flange 13 without overlapping the first inward flange 13.

As illustrated in FIG. 2, a first end surface 13a of the first inward flange 13 and a second end surface 14b of the second inward flange 14 face each other on the same plane. A pair of the first inward flange 13 and the second inward flange 14 corresponds to a pair of second metal sheets in the invention.

The third inward flange 15 is connected to the third surface 8, and is formed with a gap between the third inward flange 15 and the second inward flange 14 without overlapping the second inward flange 14.

As illustrated in FIG. 2, a first end surface 14a of the second inward flange 14 and a second end surface 15b of the third inward flange 15 face each other on the same plane. A pair of the second inward flange 14 and the third inward flange 15 also corresponds to the pair of second metal sheets in the invention.

The fourth inward flange 16 is connected to the fourth surface 10, and is formed with a gap between the fourth inward flange 16 and the third inward flange 15 without overlapping the third inward flange 15.

As illustrated in FIG. 2, a first end surface 15a of the third inward flange 15 and a second end surface 16b of the fourth inward flange 16 face each other on the same plane. A pair of the third inward flange 15 and the fourth inward flange 16 also corresponds to the pair of second metal sheets in the invention.

Additionally, the fourth inward flange 16 is formed with a gap between the fourth inward flange 16 and the first inward flange 13 without overlapping the first inward flange 13.

As illustrated in FIG. 2, a first end surface 16a of the fourth inward flange 16 and a second end surface 13b of the first inward flange 13 face each other on the same plane. A pair of the fourth inward flange 16 and the first inward flange 13 also corresponds to the pair of second metal sheets in the invention.

(Lower A Pillar 3)

The lower A pillar 3 is a press-formed product of high tensile strength steel sheet, similar to the side sill 2. The side sill 2 is joined to a flat part (hereinafter, this is referred to as a flat part) 31 of the lower A pillar 3. The flat part 31 that is a portion of the lower A pillar 3 corresponds to a first metal sheet in the invention. The side sill 2 is joined to the flat part 31 of the lower A pillar 3 via the first inward flange 13, the second inward flange 14, the third inward flange 15, and the fourth inward flange 16, for example, by resistance spot welding.

(Joining Between Side Sill 2 and Lower A Pillar 3)

As illustrated in FIG. 2, each of the first inward flange 13 and the second inward flange 14 is overlapped on the flat part 31 of the lower A pillar 3 and is joined thereto by the resistance spot welding, in a state where the first end surface 13*a* of the first inward flange 13 and the second end surface 14*b* of the second inward flange 14 face each other.

Figure 3:
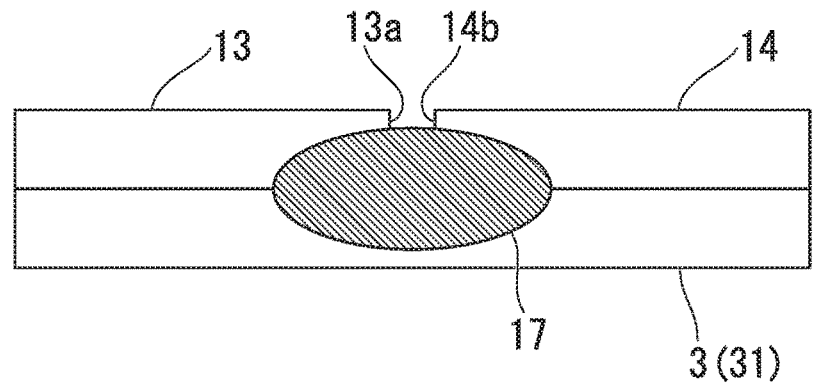
FIG. 3 is an A-A arrow sectional view (a sheet-thickness-direction sectional view of a welding spot) of the joining structure 1 illustrated in FIG. 2.

FIG. 3 is an A-A arrow sectional view (a sheet-thickness-direction sectional view of a welding spot) of the joining structure 1 illustrated in FIG. 2. As illustrated in FIG. 3, the first end surface 13*a* of the first inward flange 13 and the second end surface 14*b* of the second inward flange 14 (the end surfaces that face each other) are integrally joined to the flat part 31 of the lower A pillar 3 by means of a single mass of melted metal (hereinafter referred to as a welding nugget) 17 formed so as to spread in an elliptical shape from the joining surface (sheet-thickness-direction central part) by the resistance spot welding.

In addition, the mass of melted metal is a part that is obtained when metal melted due to high-temperature heat caused by a welding process gets cold and solidifies, and that exhibits firm joining between metal members. Generally, the mass of melted metal formed by the resistance spot welding is referred to as the welding nugget (or simply a nugget).

As illustrated in FIG. 2, each of the second inward flange 14 and the third inward flange 15 is overlapped on the flat part 31 of the lower A pillar 3 and is joined thereto by the resistance spot welding, in a state where the first end surface 14*a* of the second inward flange 14 and the second end surface 15*b* of the third inward flange 15 face each other.

The first end surface 14*a* of the second inward flange 14 and the second end surface 15*b* of the third inward flange 15 (the end surfaces that face each other) are integrally joined to the flat part 31 of the lower A pillar 3 by means of a single welding nugget 18 formed so as to spread in an elliptical shape from the joining surface (sheet-thickness-direction central part) by the resistance spot welding. In addition, since the sectional shape of the welding nugget 18 is the same as that of the sectional shape of the welding nugget 17 illustrated in FIG. 3, illustration of the sectional shape of the welding nugget 18 is omitted.

As illustrated in FIG. 2, each of the third inward flange 15 and the fourth inward flange 16 is overlapped on the flat part 31 of the lower A pillar 3 and is joined thereto by the resistance spot welding, in a state where the first end surface 15*a* of the third inward flange 15 and the second end surface 16*b* of the fourth inward flange 16 face each other.

The first end surface 15*a* of the third inward flange 15 and the second end surface 16*b* of the fourth inward flange 16 (the end surfaces that face each other) are integrally joined to the flat part 31 of the lower A pillar 3 by means of a single welding nugget 19 formed so as to spread in an elliptical shape from the joining surface (sheet-thickness-direction central part) by the resistance spot welding. In addition, since the sectional shape of the welding nugget 19 is the same as that of the sectional shape of the welding nugget 17 illustrated in FIG. 3, illustration of the sectional shape of the welding nugget 19 is omitted.

As illustrated in FIG. 2, each of the fourth inward flange 16 and the first inward flange 13 is overlapped on the flat part 31 of the lower A pillar 3 and is joined thereto by the resistance spot welding, in a state where the first end surface 16*a* of the fourth inward flange 16 and the second end surface 13*b* of the first inward flange 13 face each other.

The first end surface 16*a* of the fourth inward flange 16 and the second end surface 13*b* of the first inward flange 13 (the end surfaces that face each other) are integrally joined to the flat part 31 of the lower A pillar 3 by means of a single welding nugget 20 formed so as to spread in an elliptical shape from the joining surface (sheet-thickness-direction central part) by the resistance spot welding. In addition, since the sectional shape of the welding nugget 20 is the same as that of the sectional shape of the welding nugget 17 illustrated in FIG. 3, illustration of the sectional shape of the welding nugget 20 is omitted.

The joining strength between the side sill 2 and the lower A pillar 3 is dependent on the size (nugget diameter) of each of the welding nuggets 17, 18, 19, and 20. Therefore, it is necessary to appropriately control the nugget diameter of each of the welding nuggets 17, 18, 19, and 20 by performing the resistance spot welding under welding conditions (the pressing force of an electrode, a current value, energization time, and the like) according to a required joining strength.

For example, it is preferable to set the welding conditions such that the nugget diameter becomes equal to or more than $2.5\sqrt{t}$. Here, t is the sheet thickness (that is, the sheet thickness of the side sill 2) of each of the inward flanges 13 to 16, and the unit thereof is mm. It is more preferable to set the welding conditions such that the nugget diameter becomes equal to or more than $3.0\sqrt{t}$, and it is still more preferable to set the welding conditions such that the nugget diameter becomes equal to or more than $4.0\sqrt{t}$.

It is desirable that all of the first inward flange 13, the second inward flange 14, the third inward flange 15, and the fourth inward flange 16 are present substantially on the same plane in order to guarantee weldability, especially resistance spot weldability or laser weldability. In other words, it is preferable that the inward flanges 13 to 16 come in close contact (surface contact) with the flat part 31 of the lower A pillar 3 without overlapping each other.

Figure 4:
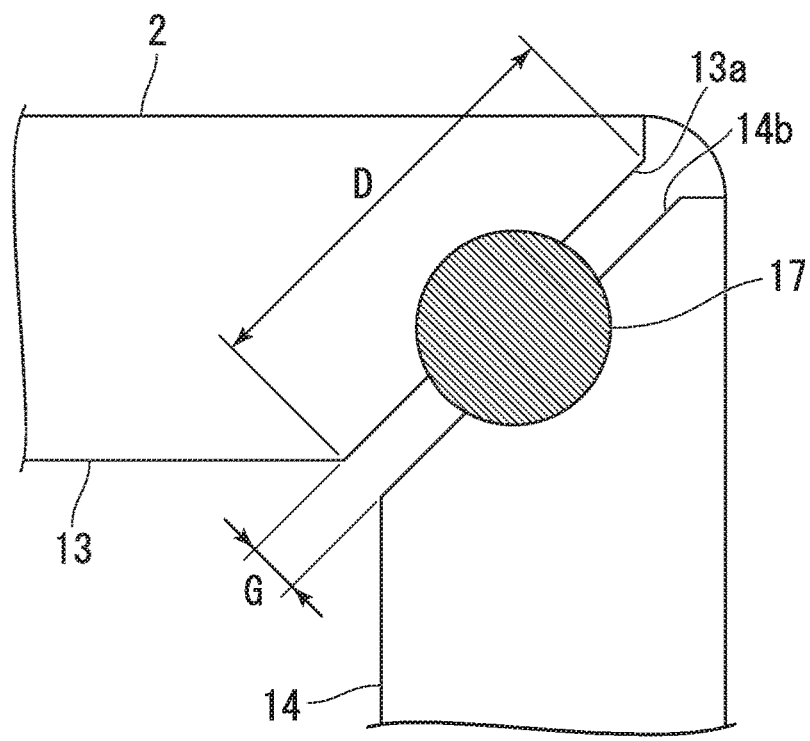
FIG. 4 is an enlarged view of a place where a welding nugget 17 is formed in the joining structure 1 illustrated in FIG. 2.

FIG. 4 is an enlarged view of a place where the welding nugget 17 is formed in the joining structure 1 illustrated in FIG. 2. As illustrated in FIG. 4, it is preferable that a distance G between the first end surface 13*a* of the first inward flange 13 and the second end surface 14*b* of the second inward flange 14 (the distance between the end surfaces that face each other: hereinafter referred to as an inter-end-surface distance) is equal to or more than 0 mm and less than 1 mm. This distance is for guaranteeing all of weight reduction, and weldability with the lower A pillar 3, especially resistance spot weldability or laser weldability.

Although this distance will be described in detail, the welding nugget 17 cannot be stably formed in a case where the inter-end-surface distance G is equal to or more than 1 mm. Thus, the torsion rigidity of the joining structure 1 decreases. From a viewpoint of improvement in the torsion rigidity, the inter-end-surface distance G is more preferably equal to or more than 0 mm and less than 0.3 mm and still more preferably equal to or more than 0 mm and less than 0.1 mm. Particularly, when the side sill 2 is deformed, it is recommended that the inter-end-surface distance G is less than 0.1 mm such that the first end surface 13*a* of the first inward flange 13 and the second end surface 14*b* of the second inward flange 14 come into contact with each other.

Additionally, in a case where the sheet thickness t (unit is mm) of the inward flanges 13 and 14 is large, melted metal is scattered at the time of the resistance spot welding. Therefore, the inter-end-surface distance G may be standardized by the sheet thickness t. A conditional expression in a case where the inter-end-surface distance G is standardized by the sheet thickness t is as follows.

Preferable conditional expression: $0 \text{ mm}^2 \leq G \times t < 1 \text{ mm}^2$     (a)

More preferable conditional expression: $0 \text{ mm}^2 \leq G \times t < 0.3 \text{ mm}^2$ (b)

Still more conditional expression: $0 \text{ mm}^2 \leq G \times t < 0.1 \text{ mm}^2$ (c)

Additionally, in a case where a preferable range of the inter-end-surface distance G is defined by the percentage of the sheet thickness t, it is preferable that the inter-end-surface distance G is equal to or more than 0 mm and less than 40% of the sheet thickness t. Since the welding nugget 17 cannot be stably formed in a case where the inter-end-surface distance G is equal to or more than 40% of the sheet thickness t, the torsion rigidity of the joining structure 1 decreases. From a the viewpoint of improvement in the torsion rigidity, it is more preferable the inter-end-surface distance G is equal to or more than 0 mm and less than 10% of the sheet thickness t.

The reason why the inter-end-surface distance G is specified is because, if the inter-end-surface distance G is too long, weld metal melted from between end surfaces at the time of the resistance spot welding may leak out and a desired welding strength may not be obtained.

As illustrated in FIG. 4, it is preferable that the extension length D of the first end surface 13a of the first inward flange 13 and the second end surface 14b of the second inward flange 14 (the extension length of the end surfaces that face each other is referred to as end surface length) is equal to or more than 3 mm and less than 50 mm. In a case where the end surface length D is less than 3 mm, it becomes difficult to perform the resistance spot welding. Even if welding can be performed by laser welding or the like instead of the resistance spot welding, rigidity as a member cannot be guaranteed in a case where end surface length D is less than 3 mm. In a case where end surface length D is equal to or more than 50 mm, the weight of the side sill 2 increases. As a result, an increase in the weight of the automobile vehicle body is caused. If the balance between higher rigidity and weight reduction is taken into consideration, it is more preferable that the end surface length D is equal to or more than 3 mm and less than 20 mm.

It is preferable that The conditions of the inter-end-surface distance G and the conditions of the end surface length D are applied not only to the pair of the first inward flange 13 and the second inward flange 14 but also to the pair of the second inward flange 14 and the third inward flange 15, the pair of the third inward flange 15 and the fourth inward flange 16, and the pair of the fourth inward flange 16 and the first inward flange 13.

Although a form in which the inward flanges 13 to 16 of the side sill 2 and the flat part 31 of the lower A pillar 3 are joined together by the four welding nuggets 17 to 20 is illustrated in FIGS. 1 and 2, the inward flanges 13 to 16 and the flat part 31 may be joined together even in places other than the places where the welding nuggets 17 to 20 are present. Accordingly, it is possible to further enhance the joining strength between the side sill 2 and the lower A pillar 3. However, since welding costs rises with an increase in the welding spots, the total of welding spots may be appropriately determined taking into consideration required joining strength and manufacturing costs.

In addition, although the side sill 2 is manufactured by press-forming a blank, which is a stock, using well-known techniques, the side sill 2 may be manufactured by performing blank press working after the inward flanges 13 to 16 are formed at edge parts of the blank in its longitudinal direction. Otherwise, the inward flanges 13 to 16 may be formed after a main body portion of the side sill 2 is formed by the blank press working.

Although a case where the masses of melted metal (welding nuggets) formed by the resistance spot welding are used for the joining between the structural members has been illustrated in the above description, for example, masses of melted metal formed by discontinuous welding, such as electric arc welding, laser welding, and laser electric arc welding, in addition to the resistance spot welding, may be used for the joining between the structural members. As the shapes of the masses of melted metal formed by these kinds of discontinuous welding, a C shape, an 0 shape, an elliptical shape, a linear shape, a curved shape, a waveform shape, a spiral shape, and the like are exemplified.

According to the joining structure 1 related to the first embodiment as described above, it is possible to achieve higher rigidity of the automobile vehicle body (particularly, a joining portion between the side sill 2 and the lower A pillar 3) while minimizing the amount of expansion of the flanges without increasing the number of times of resistance spot welding (the number of welding nuggets). That is, according to the joining structure 1, it is possible to realize three requirements such as cost reduction, weight reduction, and higher rigidity for the structural bodies in a well-balanced manner.

Hereinafter, the grounds on which the above effects are obtained by the joining structure 1 will be described referring to the following example.

Example

Figure 5:
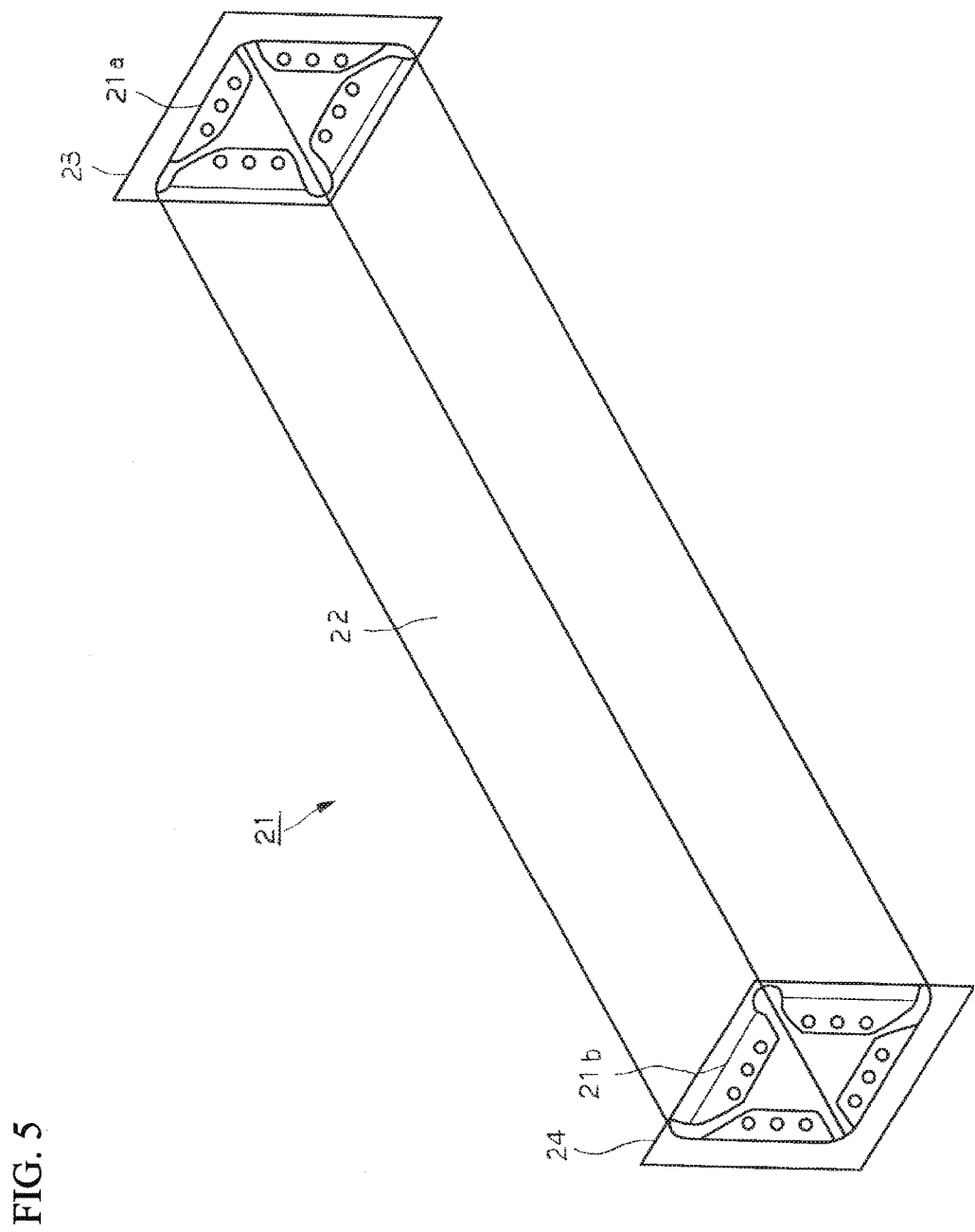
FIG. 5 is an explanatory view illustrating an analytic model of the joining structure 1.
Figure 6:
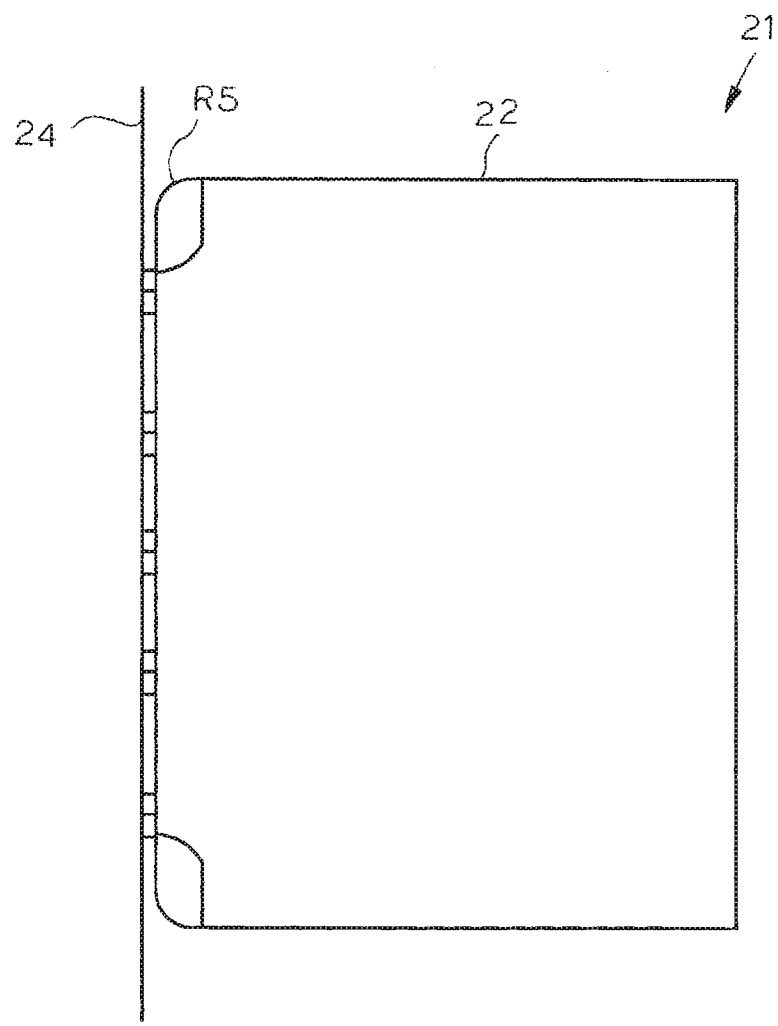
FIG. 6 is a side view illustrating a longitudinal end part of a side sill in the analytic model in an extracted manner.

An analytic model of the joining structure 1 illustrated in FIG. 1 was made, numerical analysis was performed, and the performance of the joining structure 1 was evaluated. FIG. 5 is an explanatory view illustrating the analytic model 21, and FIG. 6 is a side view illustrating a longitudinal end part of a side sill 22 in the analytic model 21 in an extracted manner.

In the analytic model 21, similar to the joining structure 1, four inward flanges are provided at each of both ends 21a and 21b of the side sill 22 (of which the entire length thereof is 500 mm and the curvature radius of a first ridgeline is 5 mm) in the longitudinal direction. The four inward flanges formed at each of both the ends 21a or 21b are joined to each of end sheets 23 and 24 serving as rigid bodies that are flat parts of the lower A pillar, with a joining strength equivalent to the joining strength of the resistance spot welding. In addition, the flat parts 23 and 24 of the side sill 22 and the lower A pillar are made of high tensile strength steel sheets with a sheet thickness of 1.4 mm and a tensile strength of 590 MPa.

Then, in the analysis of the analytic model 21, the torsional rigidity was evaluated by rotating the end sheet 24 by one degree around a central axis of the side sill 22, in a state the end sheet 23 is completely contained.

Figure 7A:
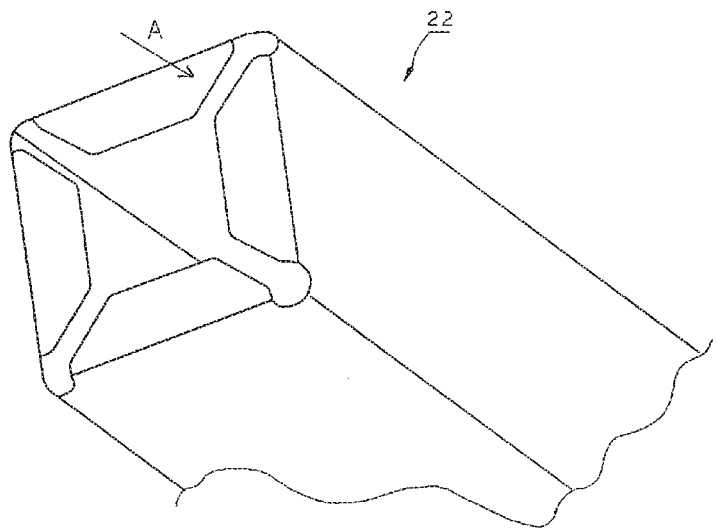
FIG. 7A is an explanatory view of an analytic model (Related-Art Shape 1) of a related-art example.
Figure 7B:
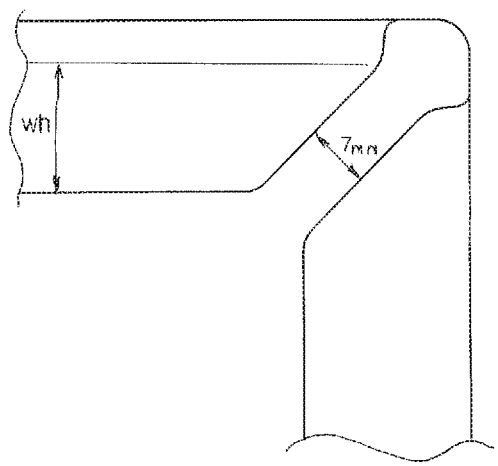
FIG. 7B is an explanatory view of the analytic model (Related-Art Shape 1) of the related-art example.
Figure 7C:
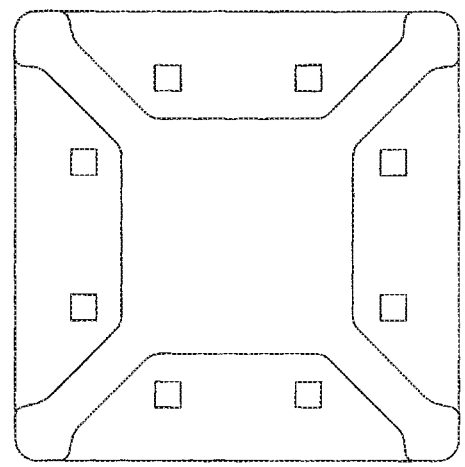
FIG. 7C is an explanatory view of the analytic model (Related-Art Shape 1) of the related-art example.
Figure 7D:
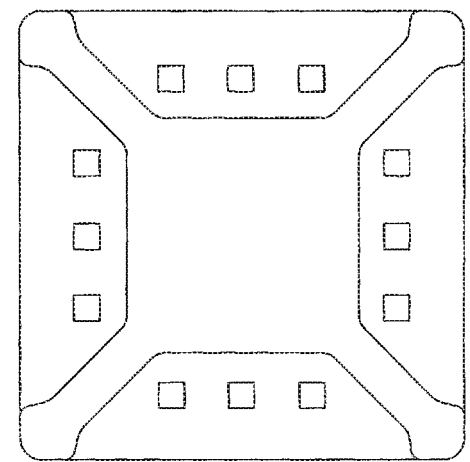
FIG. 7D is an explanatory view of the analytic model (Related-Art Shape 1) of the related-art example.

FIGS. 7A to 7D are explanatory views of an analytic model (Related-Art Shape 1) of a related-art example. FIG. 7A is a perspective view illustrating the side sill 22 in the analytic model of the related-art example. FIG. 7B is an A arrow view in FIG. 7A. FIGS. 7C and 7D are explanatory views illustrating resistance spot welding positions of the analytic model of the related-art example. FIG. 7C illustrates a case of 8-spot welding, and FIG. 7D illustrates a case of 12-spot welding. In addition, the length of one side of the resistance spot welding that forms a square shape is 4.7 mm.

This is also the same in Related-Art Shape 2 and developed shapes to be described below.

As illustrated in FIG. 7A, in the analytic model (Related-Art Shape 1), four inward flanges are spaced apart without overlapping each other. The width wh of each of the four inward flanges is 14 mm. A gap (inter-end-surface distance) between the inward flanges adjacent to each other is 7 mm at a shortest distance within a plane where the four inward flanges are present. Square marks in FIGS. 7C and 7D schematically represent welding nuggets formed by the resistance spot welding.

Figure 8A:
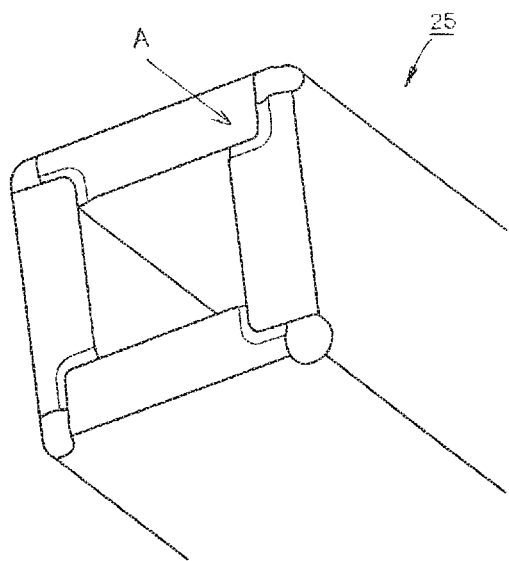
FIG. 8A is an explanatory view of an analytic model (Related-Art Shape 2) of the related-art example.
Figure 8B:
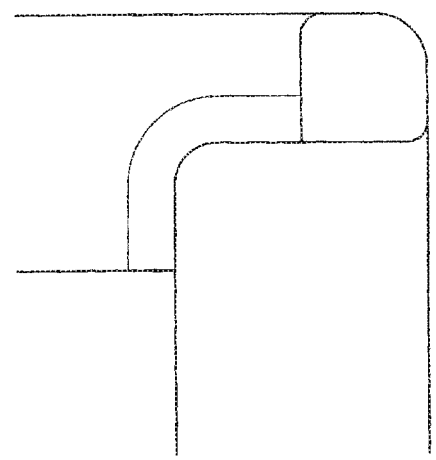
FIG. 8B is an explanatory view of the analytic model (Related-Art Shape 2) of the related-art example.
Figure 8C:
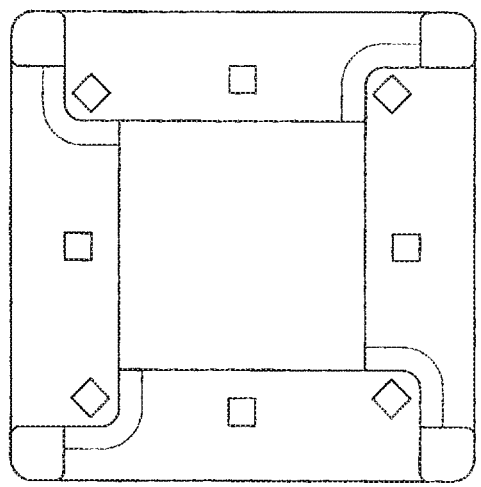
FIG. 8C is an explanatory view of the analytic model (Related-Art Shape 2) of the related-art example.
Figure 8D:
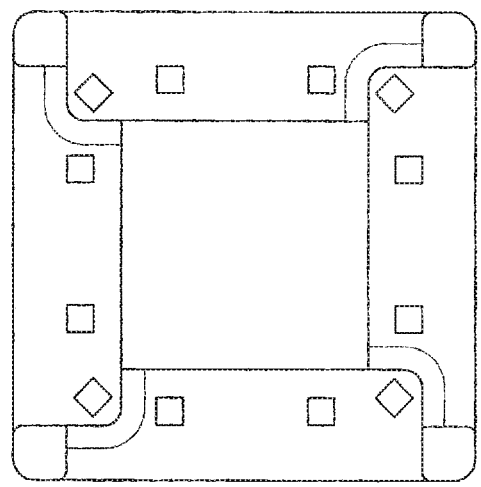
FIG. 8D is an explanatory view of the analytic model (Related-Art Shape 2) of the related-art example.

FIGS. 8A to 8D are explanatory views of an analytic model (Related-Art Shape 2) of a related-art example. FIG. 8A is a perspective view illustrating a side sill 25 in the analytic model of the related-art example. FIG. 8B is an A arrow view in FIG. 8A. FIGS. 8C and 8D are explanations illustrating resistance spot welding positions of the analytic model of the related-art example. FIG. 8C illustrates a case of 8-spot welding, and FIG. 8D illustrates a case of 12-spot welding. Square marks in FIGS. 8C and 8D schematically represent welding nuggets formed by the resistance spot welding.

As illustrated in FIG. 8A, in the analytic model (related-art shape 2), a step is formed in one of two inward flanges adjacent to each other, and the two inward flanges are joined (welded) to the step part in which these inward flanges are overlapped on each other. The width of each of the four inward flanges is 14 mm.

Figure 9A:
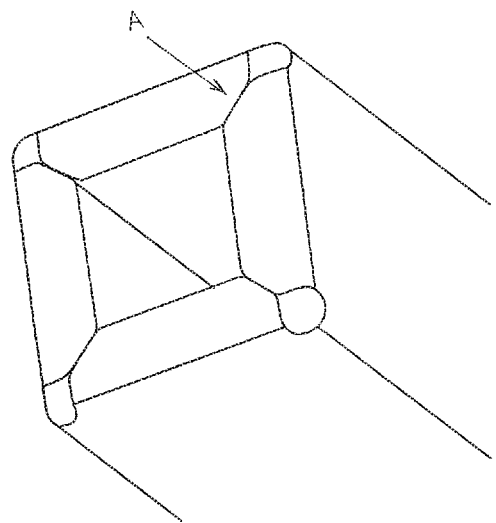
FIG. 9A is an explanatory view of an analytic model (developed shape) of an example of the invention.
Figure 9B:
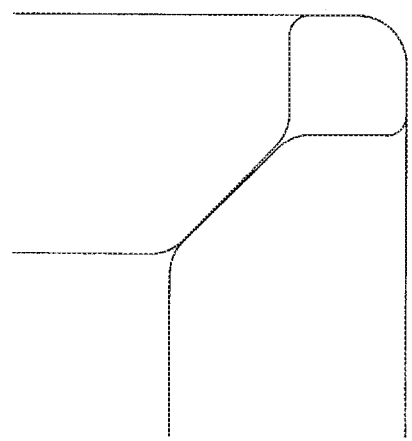
FIG. 9B is an explanatory view of an analytic model (developed shape) of the example of the invention.
Figure 9C:
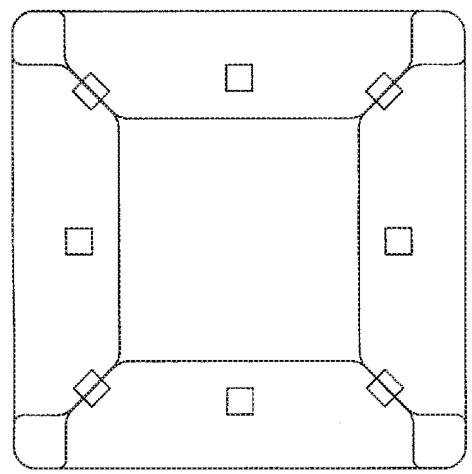
FIG. 9C is an explanatory view of an analytic model (developed shape) of the example of the invention.
Figure 9D:
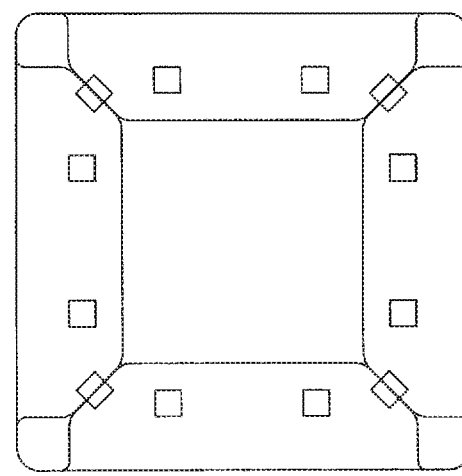
FIG. 9D is an explanatory view of an analytic model (developed shape) of the example of the invention.

FIGS. 9A to 9D are explanatory views of an analytic model (developed shape) of an example of the invention. FIG. 9A is a perspective view illustrating a side sill in the analytic model of the related-art example. FIG. 9B is an A arrow view in FIG. 9A. FIGS. 9C and 9D are explanatory views illustrating resistance spot welding positions of the analytic model of the related-art example. FIG. 9C illustrates a case of 8-spot welding, and FIG. 9D illustrates a case of 12-spot welding. Square marks in FIGS. 9C and 9D schematically represent welding nuggets formed by the resistance spot welding.

As illustrated in FIG. 9A, in the analytic model (developed shape), one end surface and the other end surface of two inward flanges adjacent to each other face each other on the same plane and come in close contact with each other. That is, the inter-end-surface distance is 0 mm. The one end surface and the other end surface are integrally joined to an end sheet (equivalent to the flat part of the lower A pillar) (not illustrate) by a single welding nugget.

Figure 10:
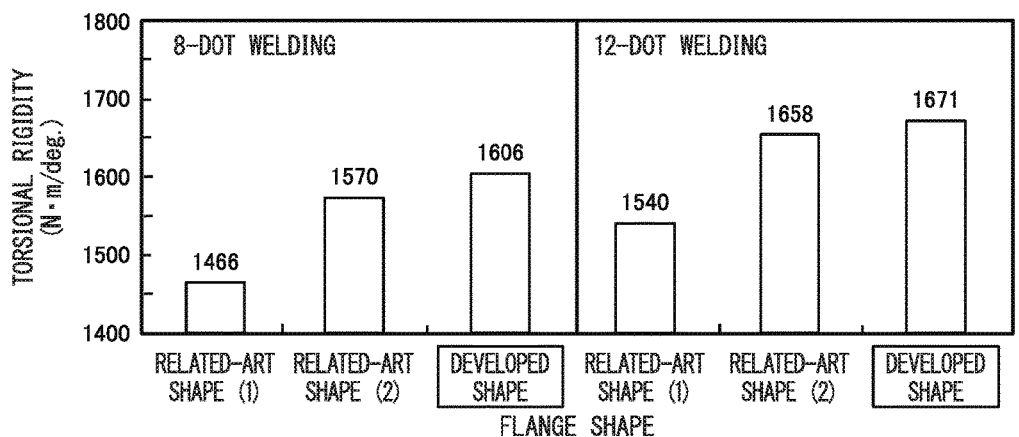
FIG. 10 is a graph illustrating torsional rigidity in the case of 8-spot welding and 12-spot welding regarding the analytic modes of Related-Art Shapes 1 and 2 and the developed shapes.
Figure 11:
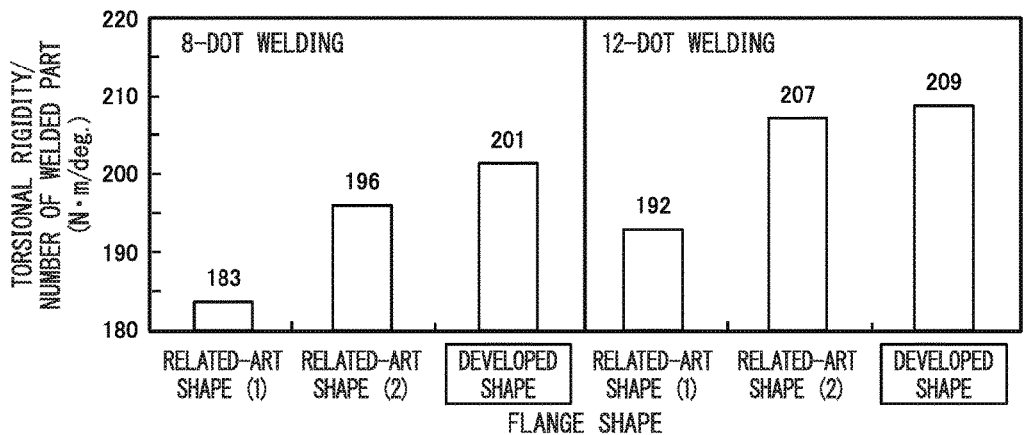
FIG. 11 is a graph illustrating torsional rigidity/the number of welded parts in the case of the 8-spot welding and the 12-spot welding regarding the analytic modes of Related-Art Shapes 1 and 2 and the developed shapes.
Figure 12:
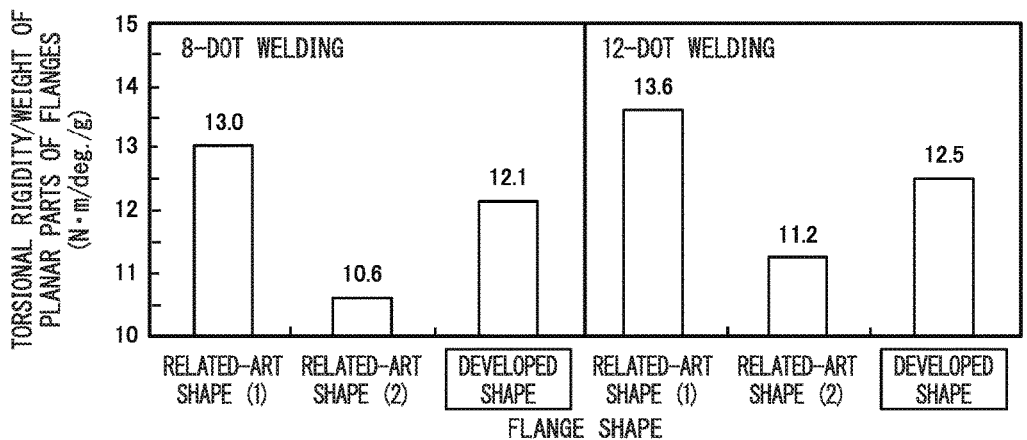
FIG. 12 is a graph illustrating torsional rigidity/(weight of planes of inward flanges) in the case of the 8-spot welding and the 12-spot welding regarding the analytic modes of Related-Art Shapes 1 and 2 and the developed shapes.

FIG. 10 is a graph illustrating the torsional rigidity in the case of 8-spot welding and 12-spot welding regarding the analytic modes of Related-Art Shapes 1 and 2 and the developed shapes. FIG. 11 is a graph illustrating the torsional rigidity/the number of welded parts (the number of welding nuggets) in the case of 8-spot welding and 12-spot welding regarding the analytic modes of Related-Art Shapes 1 and 2 and the developed shapes. FIG. 12 is a graph illustrating torsional rigidity/(weight of planes of the inward flanges) in the case of the 8-spot welding and the 12-spot welding regarding the analytic modes of Related-Art Shapes 1 and 2 and the developed shapes.

As illustrated in FIGS. 10 and 11, it can be seen that, if shapes in which the numbers of welded parts are the same number are compared with each other, the torsional rigidity and the torsional rigidity per one welded part in the developed shapes are the highest. Additionally, as illustrated in FIG. 10, it can be seen that the 8-spot welding of a developed shape has a higher rigidity than the 12-spot welding of Related-Art Shape 1. Moreover, since the developed shapes have no overlapping of the inward flanges compared to the Related-Art Shape 2, it can be seen that the developed shapes are lightweight.

Figure 13:
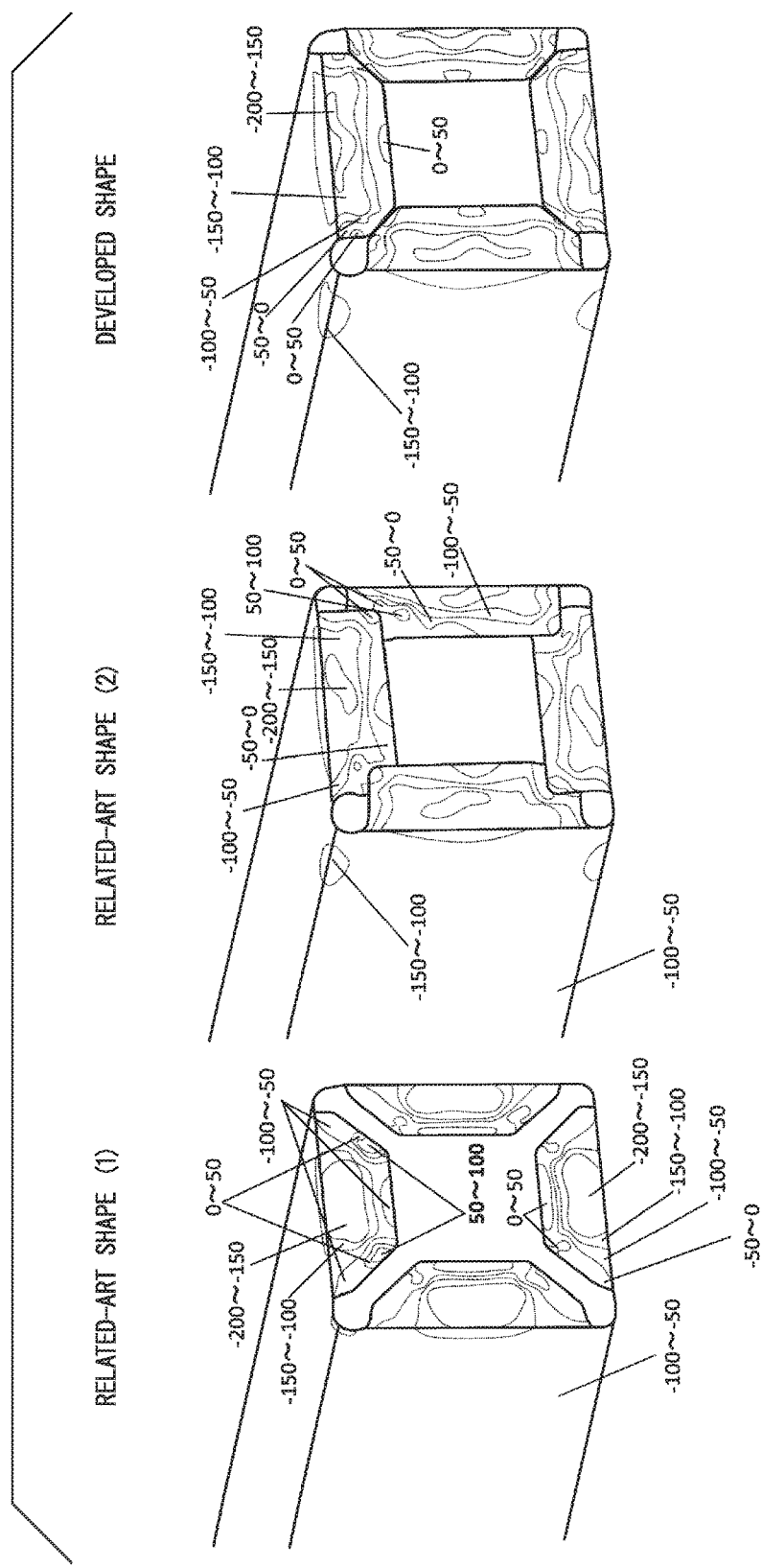
FIG. 13 is an explanatory view illustrating strain distribution when the analytic modes of Related-Art Shapes 1 and 2 and the developed shapes are rotated by one degree.

FIG. 13 is a graph illustrating strain distribution when the analytic modes of Related-Art Shapes 1 and 2 and the developed shapes are rotated by one degree. Figures in FIG. 13 represent values of shear stresses at sheet thickness centers analyzed pointed by lines.

The superiority of the developed shapes over Related-Art Shapes 1 and 2 will be described, referring to FIG. 13.

(Superiority of Developed Shapes Over Related-Art Shape 1)

Even if the developed shapes have simply the same number of welding points (the same number of welding nuggets) as Related-Art Shape 1, the number of constraint points in one flange of the 8-spot welding is two as illustrated in FIG. 7B in Related-Art Shape 1. In contrast, in the developed shapes, the number of constraint points in the one flange of the 8-spot welding become three as illustrated in FIG. 7B. As a result, since the number of points that constrains the flange increases, developed shapes have higher rigidity than Related-art Shape 1.

(Superiority of Developed Shapes Compared with Related-Art Shape 2)

It is necessary to provide a stepped part equivalent to the sheet thickness at an end part of each of the inward flanges of Related-Art Shape 2 so as to be overlapped on its adjacent inward flange, and this stepped part becomes a stress concentration part. In contrast, in the developed shapes, all of adjacent inward flanges can be made completely flat. For this reason, corner portions of the inward flanges in Related-Art shape 2 are constrained at points of the welded parts. In contrast, in the developed shapes, edges (end surfaces) of the inward flanges come in contact with each other in addition to the constraint at the points; therefore, the corner portions can be constrained by lines. For this reason, due to these two influences, in the developed shapes, as illustrated in the graph of FIG. 13, the shear stress of the inward flanges becomes uniform without being concentrated more than Related-Art Shape 2. Accordingly, the shear stress becomes uniform, and rigidity is improved.

Figure 14:
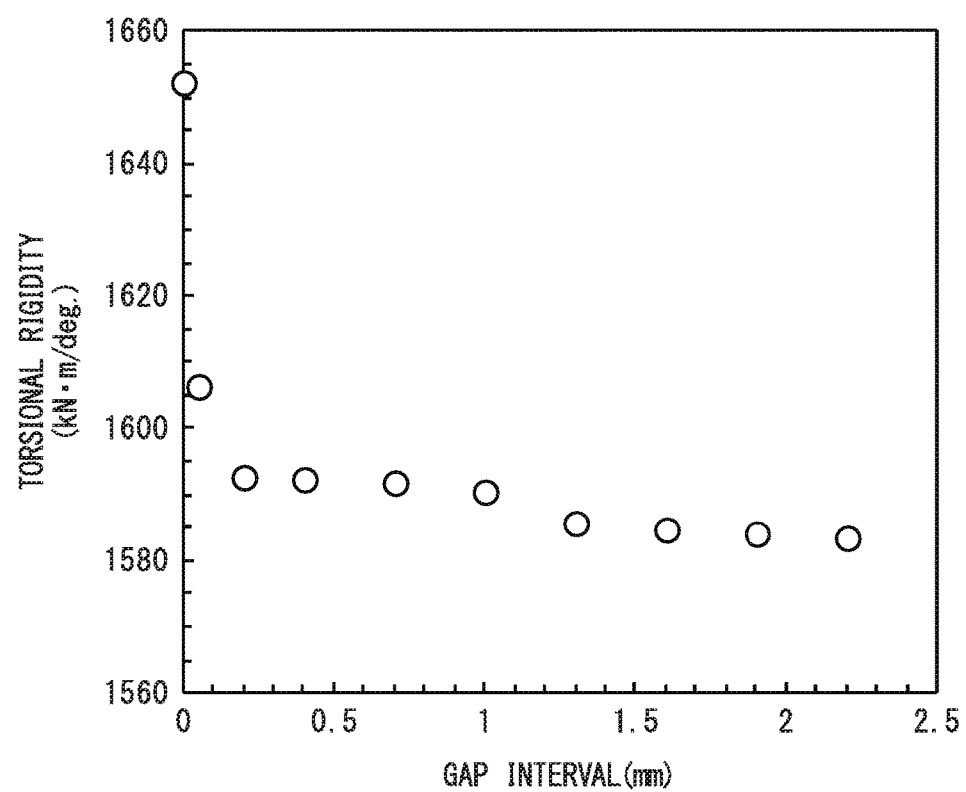
FIG. 14 illustrates results obtained by analyzing a relationship between a gap (inter-end-surface distance) between inward flanges adjacent to each other, and the torsional rigidity regarding the developed shape illustrated in FIG. 9C.

FIG. 14 illustrates results obtained by analyzing a relationship between the gap (inter-end-surface distance) between inward flanges adjacent to each other, and the torsional rigidity regarding the developed shape illustrated in FIG. 9C. As illustrated in FIG. 14, if the inter-end-surface distance becomes equal to or more than 1 mm, the torsional rigidity decreases greatly. Thus, it can be seen that it is preferable that the inter-end-surface distance is equal to or more than 0 mm and less than 1 mm. Additionally, it can be seen from FIG. 14 that the inter-end-surface distance is more preferably equal to or more than 0 mm and less than 0.3 mm, and most preferably equal to or more than 0 mm and less than 0.1 mm. Particularly, it can be sent that the torsional rigidity can be markedly improved by set the inter-end-surface distance to 0 mm, that is, bringing the end surfaces that face each other into close contact with each other.

According to the example of the invention (joining structure 1), it was proved from the above analysis results that the three requirements such as the cost reduction, weight reduction, and higher rigidity for the structural bodies can be realized in a well-balanced manner.

Additionally, according to the example of the invention (joining structure 1), it is not necessary to overlap the flanges on each other unlike Related-Art Shape 2. Thus, compared to Related-Art Shape 2, the number of processes for welding operation between the side sill and the lower A pillar can be reduced.

Second Embodiment

Next, a second embodiment of the invention will first be described. As described with reference to FIG. 23, the automobile vehicle body includes a side sill inner panel, a side sill outer panel, a first reinforcement, and a second reinforcement as the structural members. In the second embodiment, a form in which the joining structure of the invention is applied to a joining structure between these structural members will be described. Additionally, at least one of the above first reinforcement and the second reinforcement may be a center pillar inner panel.

Figure 15:
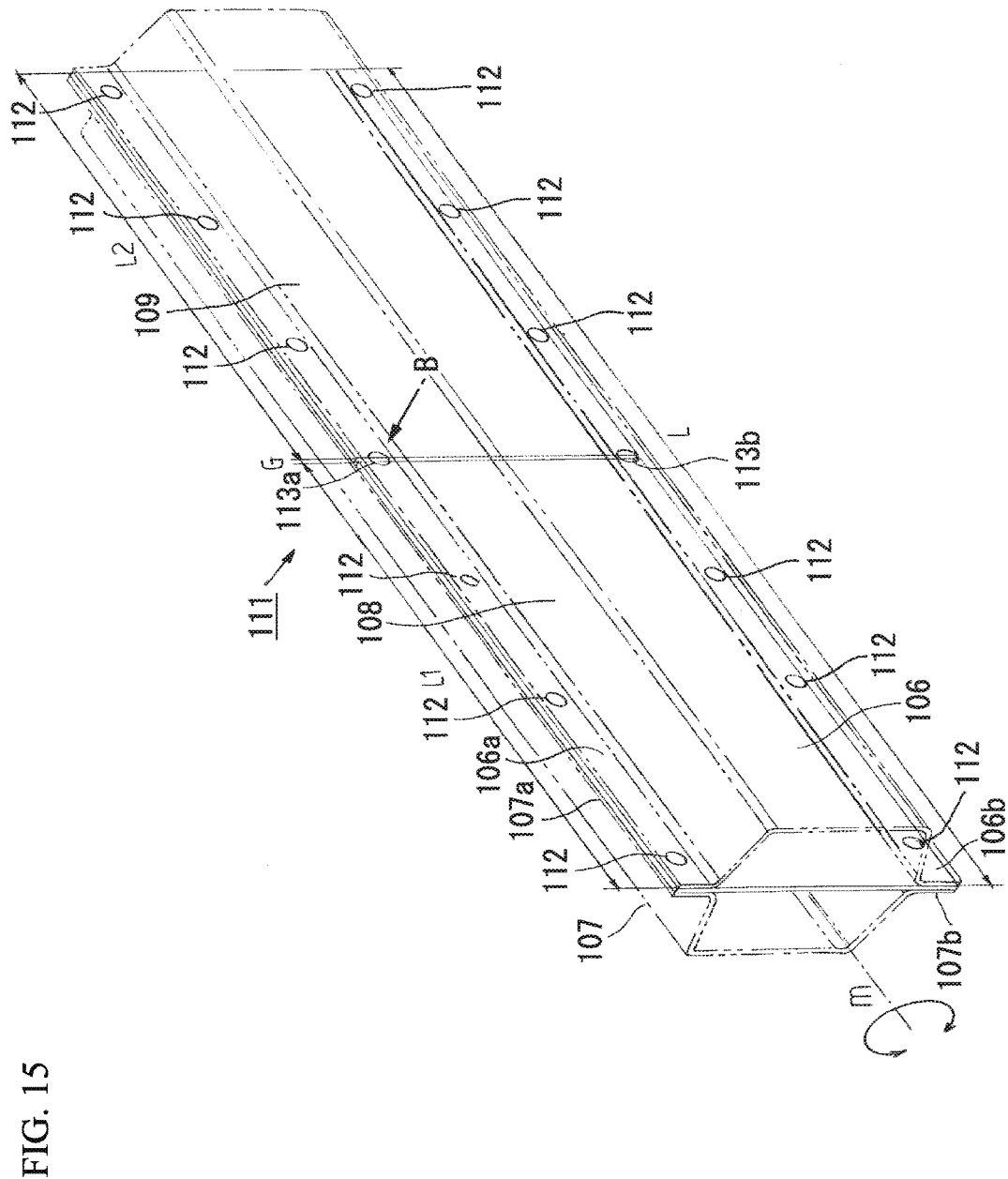
FIG. 15 is a perspective view schematically illustrating a joining structure 111 (a joining structure among a side sill inner panel 106, a side sill outer panel 107, a first reinforcement 108, and a second reinforcement 109) related to a second embodiment of the invention.
Figure 16:
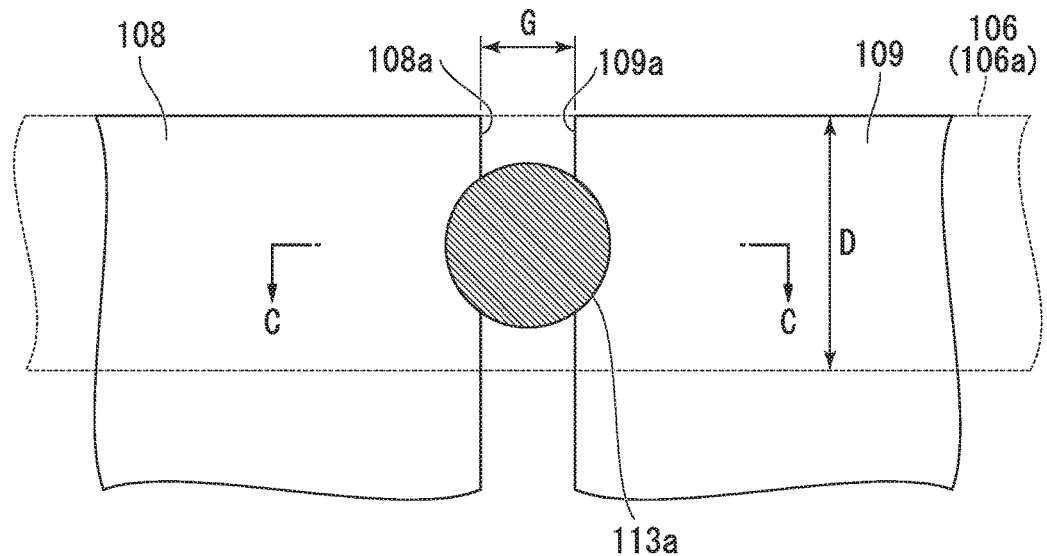
FIG. 16 is a B arrow view of FIG. 15.

FIG. 15 is a perspective view schematically illustrating a joining structure 111 (a joining structure among a side sill inner panel 106, a side sill outer panel 107, a first reinforcement 108, and a second reinforcement 109) related to the second embodiment of the invention. FIG. 16 is a B arrow view of FIG. 15. In addition, in order to make the drawings easily understood, even in FIGS. 15 and 16, the side sill inner panel 106 and the side sill outer panel 107 are illustrated in a transparent state by two-dot chain lines. Additionally, although a case where the joining structure 111 itself is a side sill becomes an example in the subsequent description, the invention is not limited to the side sill and is applied to a roof rail, an A pillar, or the like.

As illustrated in FIG. 15, the joining structure (that is, the side sill) 111 has a closed section consisting of the side sill inner panel 106, the side sill outer panel 107, the first reinforcement 108, and the second reinforcement 109.

The side sill inner panel 106 is a metal-formed sheet having a constant sectional shape in the material axis direction, more specifically, a press-formed sheet consisting of high tensile strength steel sheet. The side sill inner panel 106 has two flanges 106a and 106b, respectively, at both end parts thereof in the width direction.

The side sill inner panel 106 has a hat-shaped cross-sectional shape having the two flanges 106a and 106b as elements.

The side sill outer panel 107 is a metal-formed sheet having a constant sectional shape in the material axis direction, more specifically, a press-formed sheet consisting of high tensile strength steel sheet. The side sill outer panel 107 has two flanges 107a and 107b, respectively, at both end parts thereof in the width direction. The side sill outer panel 107 has a hat-shaped cross-sectional shape having the two flanges 107a and 107b as elements.

The first reinforcement 108 is a flat sheet consisting of high tensile strength steel sheet. The first reinforcement 108 is disposed between the two flanges 106a and 106b and the two flanges 107a and 107b, and is joined to the side sill inner panel 106 and the side sill outer panel 107 by the welding nuggets 112 formed by the resistance spot welding, in a state where the first reinforcement is overlapped on the side sill inner panel 106 and the side sill outer panel 107 in a three-layer overlapped manner. In addition, a state where the welding nuggets 112 are visualized is illustrated in FIG. 15.

Similar to the first reinforcement 108, the second reinforcement 109 is a flat sheet consisting of high tensile strength steel sheet. The second reinforcement 109 is disposed between the two flanges 106a and 106b and the two flanges 107a and 107b, and is joined to the side sill inner panel 106 and the side sill outer panel 107 by the welding nuggets 112 formed by the resistance spot welding, in a state where the first reinforcement is overlapped on the side sill inner panel 106 and the side sill outer panel 107 in a three-layer overlapped manner.

The first reinforcement 108 and the second reinforcement 109 are butted against each other or disposed at a predetermined distance from each other, in the longitudinal direction of each of the side sill inner panel 106 and the side sill outer panel 107.

As illustrated in FIGS. 15 and 16, the first reinforcement 108 and the second reinforcement 109 are sandwiched between the side sill inner panel 106 and the side sill outer panel 107, in a state where an end surface 108a of the first reinforcement 108 and an end surface 109a of the second reinforcement 109 face each other on the same plane.

Figure 17:
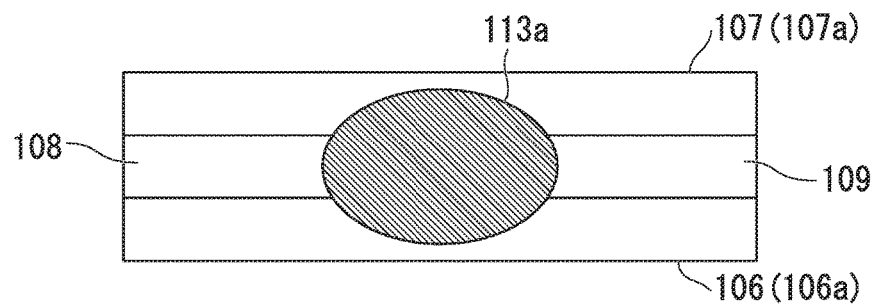
FIG. 17 is a C-C arrow sectional view (a sheet-thickness-direction sectional view of a welding spot) of a welding spot illustrated in FIG. 16.

FIG. 17 is a C-C arrow sectional view (a sheet-thickness-direction sectional view of a welding spot) of a welding spot illustrated in FIG. 16. As illustrated in FIGS. 16 and 17, the end surface 108a of the first reinforcement 108 and the end surface 109a of the second reinforcement 109 (the end surfaces that face each other) are integrally joined to a flange 106a of the side sill inner panel 106 and a flange 107a of the side sill outer panel 107 by a single welding nugget 113a formed so as to spread in an elliptical shape from the joining surface (sheet-thickness-direction central part) by the resistance spot welding.

In this way, in the second embodiment, if attention is paid to the welding spot (welding nugget 113a) illustrated in FIG. 16, the first reinforcement 108 and the second reinforcement 109 correspond to the pair of second metal sheets in the invention, and the flange 106a of the side sill inner panel 106 corresponds to the first metal sheet in the invention, and the flange 107a of the side sill outer panel 107 in the invention corresponds to a third metal sheet.

As illustrated in FIG. 15, the end surface 108a of the first reinforcement 108 and the end surface 109a of the second reinforcement 109 (the end surfaces that face each other) are integrally joined to a flange 106b of the side sill inner panel 106 and a flange 107b of the side sill outer panel 107 by a single welding nugget 113b formed so as to spread in an elliptical shape from the joining surface (sheet-thickness-direction central part) by the resistance spot welding. In addition, since the sectional shape of the welding nugget 113b in the thickness direction is the same as that of the sectional shape of the welding nugget 113a illustrated in FIG. 17, illustration of the sectional shape of the welding nugget 113b is omitted.

In this way, in the second embodiment, if attention is paid to the welding nugget 113b, the first reinforcement 108 and the second reinforcement 109 correspond to the pair of second metal sheets in the invention, and the flange 106b of the side sill inner panel 106 corresponds to the first metal sheet in the invention, and the flange 107b of the side sill outer panel 107 in the invention corresponds to a third metal sheet.

The joining strength among the side sill inner panel 106, the side sill outer panel 107, the first reinforcement 108, and the second reinforcement 109 is dependent on the size (nugget diameter) of each of the welding nuggets 112, 113a, and 113b. Therefore, it is necessary to appropriately control the nugget diameter of each of the welding nuggets 112, 113a, and 113b by performing the resistance spot welding under welding conditions (the pressing force of an electrode, a current value, energization time, and the like) according to a required joining strength. For example, it is preferable to set the welding conditions such that the nugget diameter becomes equal to or more than $2.5\sqrt{t}$. Here, t is the sheet thickness of each of the reinforcements 108 to 109, and the unit thereof is mm. It is more preferable to set the welding conditions such that the nugget diameter becomes equal to or more than $3.0\sqrt{t}$, and it is still more preferable to set the welding conditions such that the nugget diameter becomes equal to or more than $4.0\sqrt{t}$.

It is desirable that both of the first reinforcement 108 and the second reinforcement 109 are present substantially on the same plane in order to guarantee weldability, especially resistance spot weldability or laser weldability. In other words, it is preferable that the first reinforcement 108 and the second reinforcement 109 come in close contact (surface contact) with the flanges 106a and 106b of the side sill inner panel 106 and the flanges 107a and 107b of the side sill outer panel 107 without overlapping each other.

Similar to the first embodiment, even in the second embodiment, it is preferable that the distance (inter-end-surface distance) G between the end surface 108a of the first reinforcement 108 and the end surface 109a of the second reinforcement 109 is equal to or more than 0 mm and less than 1 mm (refer to FIGS. 15 and 16). Additionally, similar to the first embodiment, even in the second embodiment, from a viewpoint of improvement in the torsion rigidity, the inter-end-surface distance G is more preferably equal to or more than 0 mm and less than 0.3 mm and still more preferably equal to or more than 0 mm and less than 0.1 mm.

Additionally, similar to the first embodiment, even in the second embodiment, in a case where the sheet thickness t (unit is mm) of the first reinforcement 108 and the second reinforcement 109 is large, melted metal is scattered at the time of the resistance spot welding. Therefore, the inter-end-surface distance G may be standardized by the sheet thickness t. A conditional expression in a case where the inter-end-surface distance G is standardized by the sheet thickness t is the same as Conditional Expressions (a) to (c) described in the first embodiment.

Additionally, similar to the first embodiment, even in the second embodiment, in a case where a preferable range of the inter-end-surface distance G is defined by the percentage of the sheet thickness t, it is preferable that the inter-end-surface distance G is equal to or more than 0 mm and less than 40% of the sheet thickness t. Since the welding nuggets 113a and 113b cannot be stably formed in a case where the inter-end-surface distance G is equal to or more than 40% of the sheet thickness t, the torsion rigidity of the joining structure 111 decreases. From a the viewpoint of improvement in the torsion rigidity, it is more preferable the inter-end-surface distance G is equal to or more than 0 mm and less than 10% of the sheet thickness t.

The reason why the inter-end-surface distance G is specified is because, if the inter-end-surface distance G is too long, weld metal melted from between end surfaces at the time of the resistance spot welding may leak out and a desired welding strength may not be obtained.

Similar to the first embodiment, even in the second embodiment, it is preferable that the extension length (end surface length) D of the end surface 108a of the first reinforcement 108 and the end surface 109a of the second reinforcement 109 is equal to or more than 3 mm and less than 50 mm (refer to FIG. 16). Here, as illustrated in FIG. 16, the end surface length D in the second embodiment is the length of a portion overlapping the flanges 106a and 107a, in the entire length of the end surfaces 108a and 109a that face each other. Meanwhile, the end surface length D in a welding spot opposite to the welding spot illustrated in FIG. 16, that is, a formation spot of the welding nugget 113b, is the length of a portion overlapping the flanges 106b and 107b, in the entire length of the end surfaces 108a and 109a that face each other.

In a case where the end surface length D is less than 3 mm, it becomes difficult to perform the resistance spot welding. Even if welding can be performed by laser welding or the like instead of the resistance spot welding, rigidity as a member cannot be guaranteed in a case where end surface length D is less than 3 mm. In a case where end surface length D is equal to or more than 50 mm, the weight of the member increases. As a result, an increase in the weight of the automobile vehicle body is caused. If the balance between higher rigidity and weight reduction is taken into consideration, it is more preferable that the end surface length D is equal to or more than 3 mm and less than 20 mm.

Although a case where the masses of melted metal (welding nuggets) formed by the resistance spot welding are used for the joining between the structural members has been illustrated in the above description, for example, masses of melted metal formed by discontinuous welding, such as electric arc welding, laser welding, and laser electric arc welding, in addition to the resistance spot welding, may be used for the joining between the structural members. As the shapes of the masses of melted metal formed by these kinds of discontinuous welding, a C shape, an 0 shape, an elliptical shape, a linear shape, a curved shape, a waveform shape, a spiral shape, and the like are exemplified.

For this reason, in the joining structure 111, even by using the dot-like discontinuous welding such as the resistance spot welding, a high torsional rigidity around the axial center is obtained at low costs while suppressing an increase in weight.

In the above description, since the joining structure 111 is the side sill, a case where the first reinforcement 108 and the second reinforcement 109 are sandwiched between the side sill inner panel 106 and the side sill outer panel 107 is exemplified. However, the invention is not limited to this case, and can also be applied to a form in which a pair of reinforcements (the pair of second metal sheets) are sandwiched between an upper panel (the first metal sheet) and a lower panel (the third metal sheet).

According to the joining structure 111 related to the second embodiment as described above, it is possible to achieve higher rigidity of the automobile vehicle body (particularly, improvement in the torsional rigidity of the side sill itself) while minimizing the area of the reinforcements overlapped on the panels without increasing the number of times of resistance spot welding (the number of welding nuggets). That is, according to the joining structure 111, it is possible to realize three requirements such as cost reduction, weight reduction, and higher rigidity for the structural bodies in a well-balanced manner.

Hereinafter, the grounds on which the above effects are obtained by the joining structure 111 will be described referring to the following example.

Example

Figure 23:
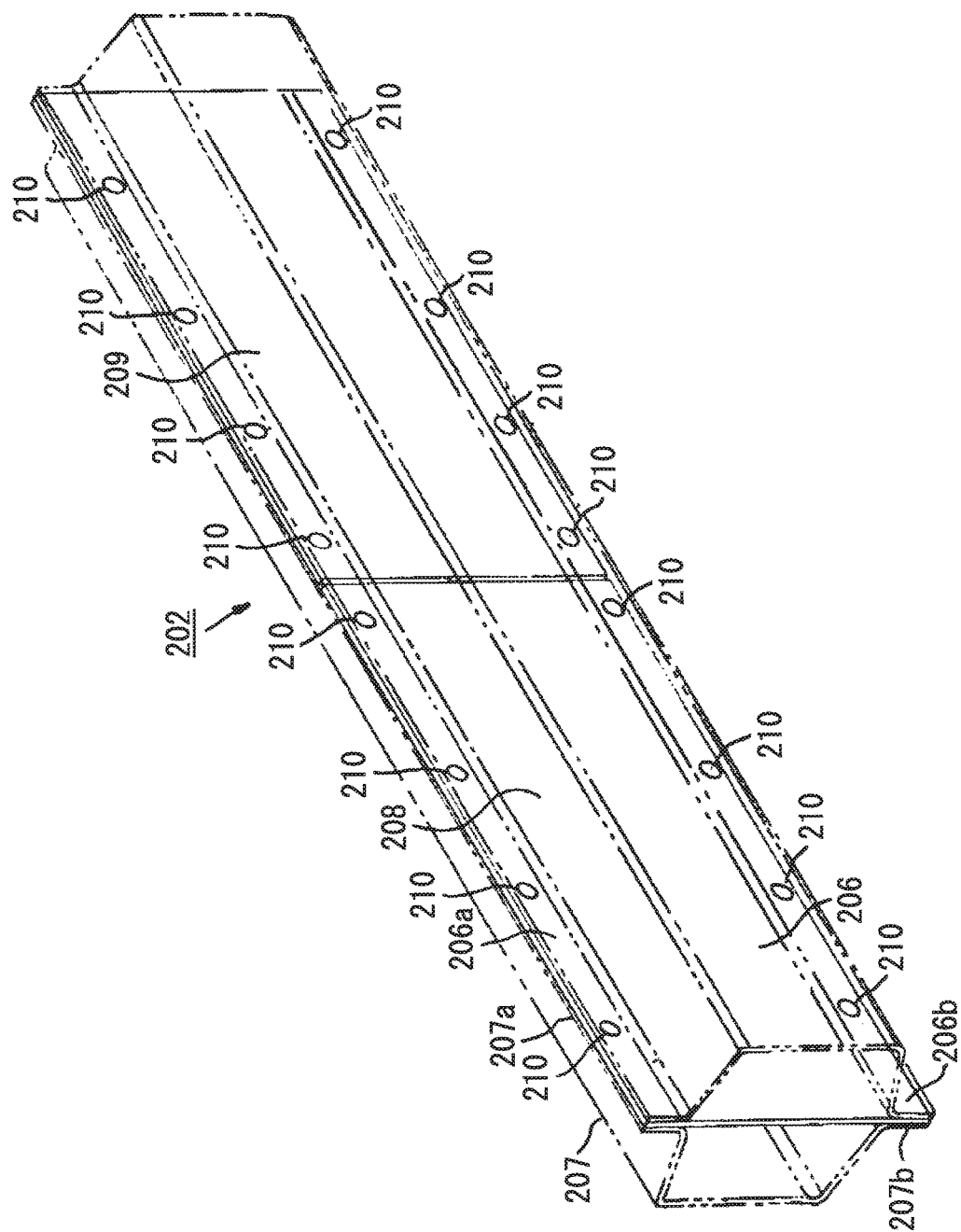
FIG. 23 is a perspective view illustrating an example of the side sill.

Regarding the joining structure (side sill) 111 illustrated in FIG. 15 and the side sills 2-1 to 2-3 of the related-art example having the structure as illustrated in FIG. 23, the torsional rigidity when torsion of 0.1 deg from a central angle was given to the side sills by applying torsion around the axial center to the other end part in a state where one end part is constrained was obtained by numerical analysis.

Figure 18:
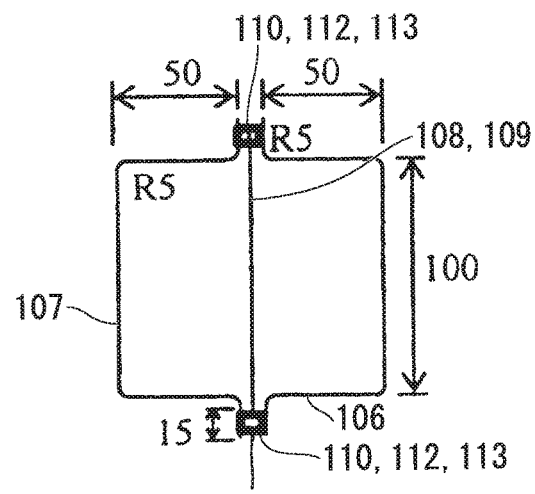
FIG. 18 is an explanatory view illustrating the sectional shape of side sills.

FIG. 18 is an explanatory view illustrating a cross-sectional shape of the side sill 111 and the side sills 2-1 to 2-3. In addition, the sheet thickness center position of each of the side sill inner panel 106, the side sill outer panel 107, the first reinforcement 108, and the second reinforcement 109 is illustrated in FIG. 18.

In this analysis, both of respective lengths L1 and L2 of the first reinforcement 108 and the second reinforcement 109 and L2 were set to 239.975 mm, and the inter-end-surface distance G was 0.05 mm. Additionally, respective strengths and sheet thicknesses of the side sill inner panel 106, the side sill outer panel 107, the first reinforcement 108, and the second reinforcement 109 were as follows.

Figure 19:
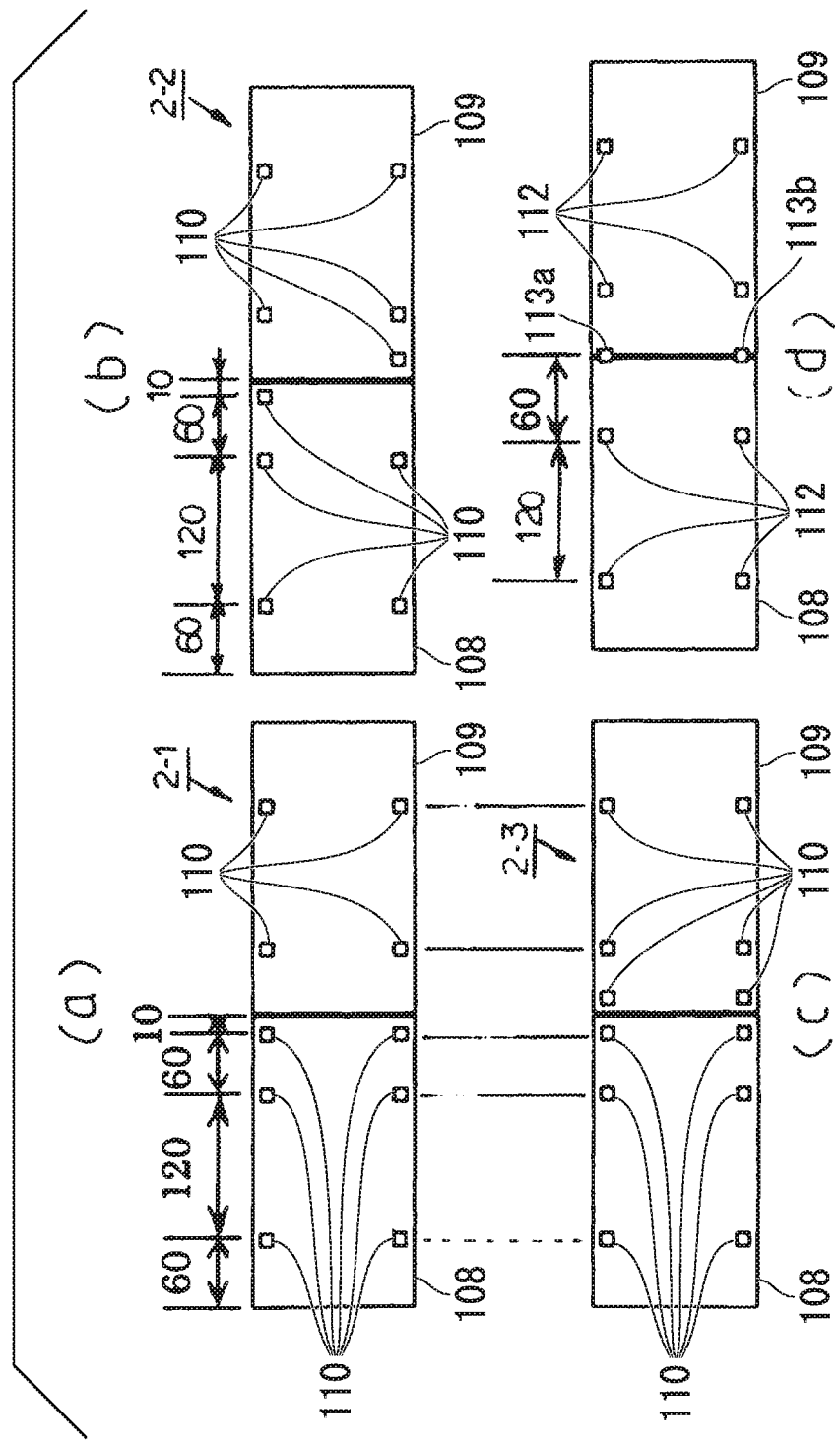
FIG. 19 is an explanatory view illustrating respective arrangements of the first reinforcement and the second reinforcement and the positions of welding nuggets in side sills of the related-art examples and a side sill of the example of the invention.

Side sill inner panel 106: 980 MPa, 1.0 mm
Side sill outer panel 107: 980 MPa, 1.0 mm
First reinforcement 108: 980 MPa, 1.0 mm
Second reinforcement 109: 980 MPa, 1.0 mm (a) to (d) of FIG. 19 are explanatory views illustrating respective arrangements of the first reinforcement 108 and the second reinforcement 109 and the positions of the welding nuggets 110, 112, 113a, and 113b in side sills 2-1 to 2-3 of the related-art examples and the side sill 111 of the example of the invention.

Figure 20:
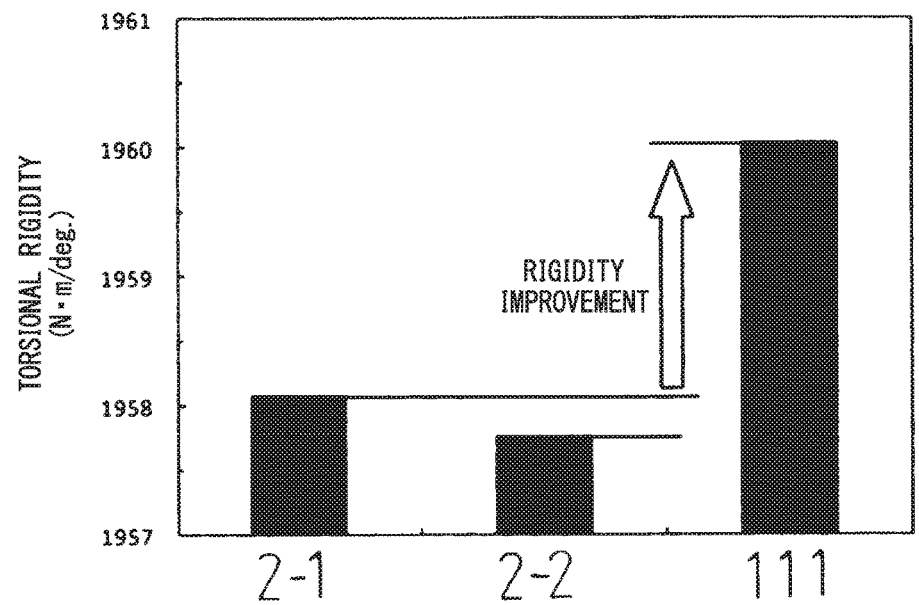
FIG. 20 is a graph illustrating analysis results in an example.
Figure 21:
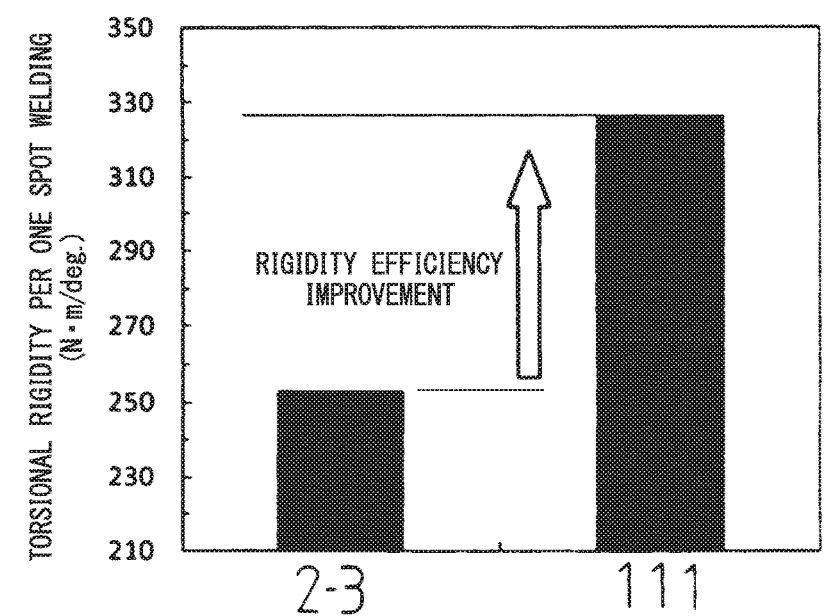
FIG. 21 is a graph illustrating analysis results in the example.

Analysis results are illustrated in graphs of FIGS. 20 and 21. FIG. 20 is a graph illustrating the torsional rigidity when torsion of 0.1 deg from the central angle is given to the side sills 2-1, 2-2, and 111. FIG. 21 is a graph illustrating the torsional rigidity when torsion of 0.1 deg from the central angle per one welding nugget is given to the side sills 2-3 and 111.

It can be seen from the graphs of FIGS. 20 and 21 that, according to the invention, compared to the related art, even by performing welding using the dot-like discontinuous welding such as the resistance spot welding, a high torsional rigidity around the axial center is obtained at low costs while suppressing an increase in weight.

Although the first and second embodiments of the invention have been described above, the invention is not limited to this, and the invention can be modified in various forms without departing from the scope of the invention.

Figure 22:
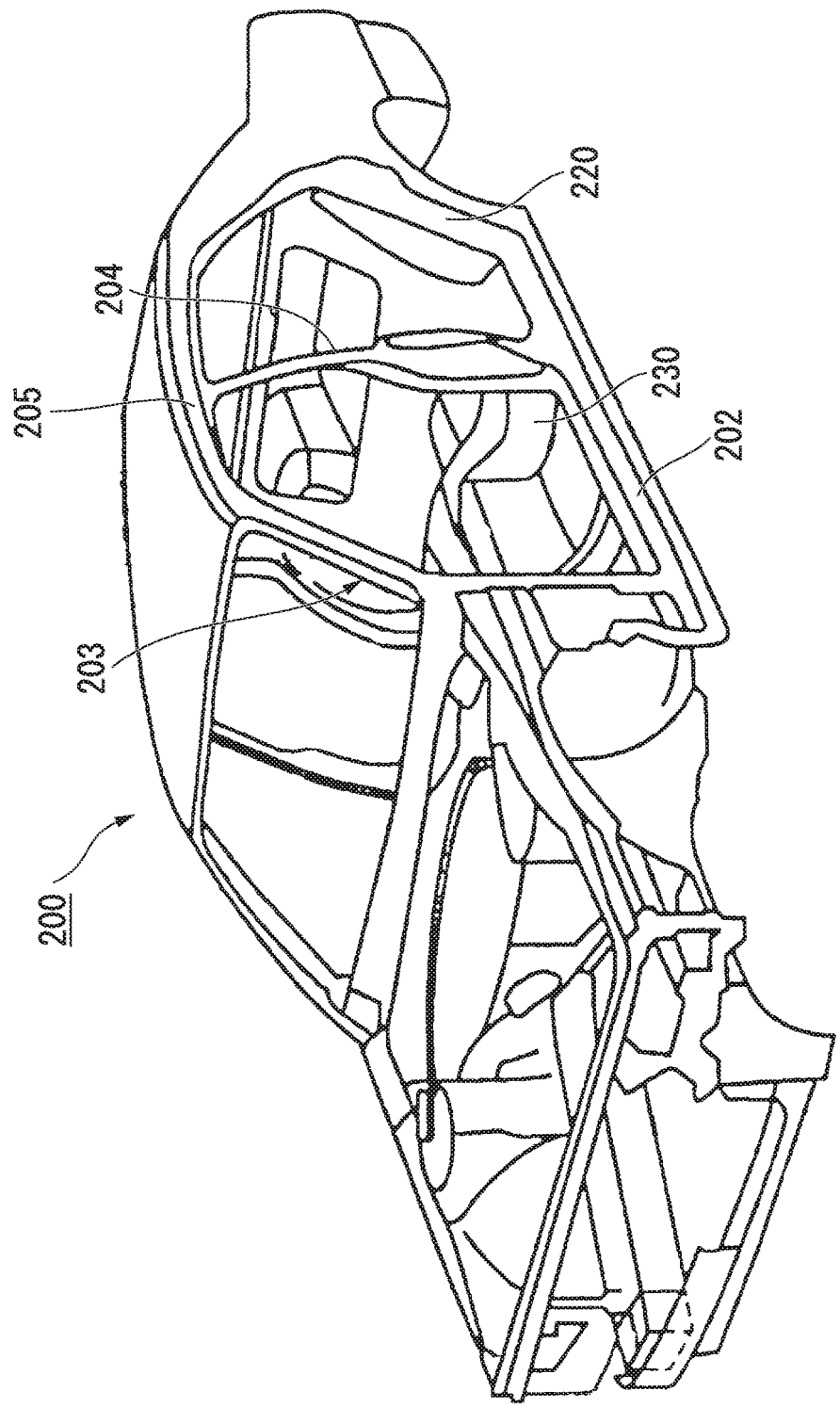
FIG. 22 is an explanatory view illustrating an example of a body shell of an automobile vehicle body.

Although a case where the joining structure of the invention is applied to the joining structure between the side sill 2 and the lower A pillar 3 has been exemplified in the above first embodiment, for example, the joining structure (the joining structure described in the first embodiment) of the invention can also be applied to a joining structure between a side sill 202 and a Lower C pillar 220 that are illustrated in FIG. 22, or a joining structure between the side sill 202 and a cross member 230.

A case where the joining structure of the invention is applied to the joining structure of the side sill inner panel 106, the side sill outer panel 107, the first reinforcement 108, and the second reinforcement 109 has been exemplified in the above second embodiment. However, for example, in a case where a structure in which a pair of reinforcements are sandwiched between two panels is needed to be adopted in a B pillar 204 or a roof rail 205 illustrated in FIG. 22, the joining structure (joining structure described in the second embodiment) of the invention can also be applied to that structure.

In the above first and second embodiments, the automobile vehicle body has been mentioned as an example as the structural body in which cost reduction, weight reduction, and higher rigidity are required. However, the joining structure of the invention can also be applied to, for example, other structural bodies, such as vehicle bodies of railroad vehicles and fuselages of aircrafts, without being limited to the automobile vehicle body.

REFERENCE SIGNS LIST

1: JOINING STRUCTURE
2: SIDE SILL (METAL-FORMED SHEET)
3: LOWER A PILLAR
13: FIRST INWARD FLANGE (SECOND METAL SHEET)
14: SECOND INWARD FLANGE (SECOND METAL SHEET)
15: THIRD INWARD FLANGE (SECOND METAL SHEET)
16: FOURTH INWARD FLANGE (SECOND METAL SHEET)
31: FLAT PART OF LOWER A PILLAR (FIRST METAL SHEET)
17 to 20: WELDING NUGGET (MASS OF MELTED METAL)
111: JOINING STRUCTURE
106: SIDE SILL INNER PANEL (FIRST METAL-FORMED SHEET)
107: SIDE SILL OUTER PANEL (SECOND METAL-FORMED SHEET)
106A, 106B: FLANGE (FIRST METAL SHEET)
107A, 107B: FLANGE (THIRD METAL SHEET)
108: FIRST REINFORCEMENT (SECOND METAL SHEET)
109: SECOND REINFORCEMENT (SECOND METAL SHEET)
113A, 113B WELDING NUGGET (MASS OF MELTED METAL)

The invention claimed is:

1. A joining structure comprising:
a first metal sheet; and
a pair of second metal sheets,
wherein each of the pair of second metal sheets is overlapped on the first metal sheet in a state where an end surface of one of the second metal sheets and an end surface of the other second metal sheet face each other,
wherein the end surfaces that face each other are integrally joined to the first metal sheet by means of a single mass of melted metal, and
wherein the pair of second metal sheets is a pair of inward flanges provided in a material-axis-direction end part of a metal-formed sheet having a constant quadrangular sectional shape in the material axis direction.

2. The joining structure according to claim 1,
wherein the pair of second metal sheets is present on the same plane.

3. The joining structure according to claim 1,
wherein a distance between the end surfaces that face each other is equal to or more than 0 mm and less than 1 mm.

4. The joining structure according to claim 1,
wherein the following Conditional Expression (a) is satisfied when a sheet thickness of the pair of second metal sheets is defined as t (mm) and the distance between the end surfaces that face each other is defined as G (mm), $$0 \text{ mm}^2 \leq G \times t < 1 \text{ mm}^2 \qquad (a).$$

5. The joining structure according to claim 1,
wherein the distance between the end surfaces that face each other is less than 40% of the sheet thickness of the second metal sheets.

6. The joining structure according to claim 1,
wherein an extension length of the end surfaces that face each other is equal to or more than 3 mm and less than 50 mm.

7. The joining structure according to claim 1, wherein the metal-formed sheet is a side sill of an automobile vehicle body, and the first metal sheet is a portion of a lower A pillar of the automobile vehicle body.

* * * * *